(12) United States Patent
Oksman et al.

(10) Patent No.: US 12,418,386 B2
(45) Date of Patent: Sep. 16, 2025

(54) APPARATUSES FOR FULL DUPLEX DATA TRANSMISSION OVER A WIRED COMMUNICATION LINK AND METHODS FOR AN APPARATUS FOR FULL DUPLEX DATA TRANSMISSION COUPLEABLE TO A WIRED COMMUNICATION LINK

(71) Applicant: Intel Corporation, Santa Clara, CA (US)

(72) Inventors: Vladimir Oksman, Morganville, NJ (US); Rainer Strobel, Munich (DE); Dietmar Schoppmeier, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 17/753,091

(22) PCT Filed: Sep. 26, 2020

(86) PCT No.: PCT/US2020/052952
§ 371 (c)(1),
(2) Date: Feb. 18, 2022

(87) PCT Pub. No.: WO2021/062326
PCT Pub. Date: Apr. 1, 2021

(65) Prior Publication Data
US 2022/0294600 A1    Sep. 15, 2022

Related U.S. Application Data

(60) Provisional application No. 62/906,959, filed on Sep. 27, 2019.

(51) Int. Cl.
*H04L 5/14* (2006.01)
*H04L 5/00* (2006.01)
(Continued)

(52) U.S. Cl.
CPC ............. *H04L 5/14* (2013.01); *H04L 5/0048* (2013.01); *H04W 72/0446* (2013.01); *H04W 76/28* (2018.02)

(58) Field of Classification Search
USPC ......................................................... 370/329
See application file for complete search history.

(56) References Cited

U.S. PATENT DOCUMENTS

| 2018/0219640 | A1* | 8/2018 | Kerpez | H04B 3/32 |
| 2019/0386776 | A1* | 12/2019 | Lefevre | H04L 1/0042 |
| 2020/0220704 | A1* | 7/2020 | Maes | H04L 27/2607 |

FOREIGN PATENT DOCUMENTS

| EP | 3182636 A1 | 6/2017 |
| EP | 3340519 A1 | 6/2018 |

(Continued)

*Primary Examiner* — Ayman A Abaza
*Assistant Examiner* — Hooman Houshmand
(74) *Attorney, Agent, or Firm* — 2SPL Patent Attorneys PartG mbB; Kieran O'Leary

(57) ABSTRACT

An apparatus for a wired communication link is provided. The apparatus includes transmit circuitry for transmitting downstream data over the wired communication link during a frame for full duplex data transmission. The frame comprises a first subframe and a second subframe for downstream data transmission. The first subframe coincides in time with a third subframe of the frame for upstream data transmission, wherein the second subframe coincides in time with a fourth subframe of the frame for upstream data transmission. The first subframe and the fourth subframe are priority subframes. The second subframe and the third subframe are non-priority subframes. Each of the first subframe and the fourth subframes comprises a respective discontinuous operation interval.

25 Claims, 8 Drawing Sheets

(51) Int. Cl.
*H04W 72/0446* (2023.01)
*H04W 76/28* (2018.01)

(56) References Cited

FOREIGN PATENT DOCUMENTS

EP          2661009 B1   11/2018
WO       2019052934 A1   3/2019

* cited by examiner

APPARATUSES FOR FULL DUPLEX DATA TRANSMISSION OVER A WIRED COMMUNICATION LINK AND METHODS FOR AN APPARATUS FOR FULL DUPLEX DATA TRANSMISSION COUPLEABLE TO A WIRED COMMUNICATION LINK

CROSS-REFERENCE TO RELATED APPLICATIONS

This application is a 35 U.S.C. § 371 (c) national stage entry of International Application PCT/US2020/052952, filed on Sep. 26, 2020. The International Application claimed priority to U.S. Provisional Application 62/906,959, filed on Sep. 27, 2019. The contents of these earlier filed applications are incorporated by reference herein in their entirety.

FIELD

Examples relate to Full DupleX (FDX) data exchange over a wired communication link. In particular, examples relate to apparatuses for a wired communication link and methods for an apparatus coupleable to a wired communication link.

BACKGROUND

Saving of power is important in modern telecommunication systems to become more efficient, accommodate smaller space, and especially, when operation using remote feeding (e.g. from a Central Office, CO) or reversed feeding (e.g. from a Customer Premises Equipment, CPE) is used for an intermediate unit residing in a cabinet or distribution point (e.g. a Distribution Point Unit, DPU).

Modern telecommunication systems are designed for FDX operation in order to increase the throughput and the latency of the telecommunication systems.

Hence, there may be a desire for power saving FDX operation in telecommunication systems.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
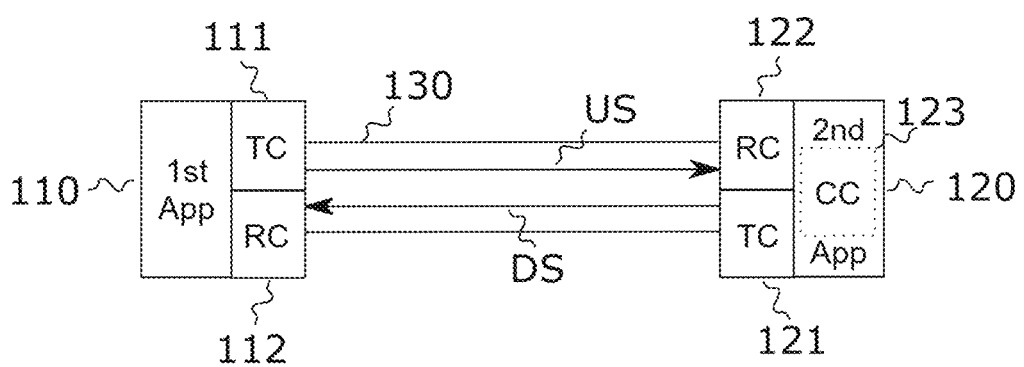
FIG. 1 illustrates an example of a wired communication system.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a wired (tele-)communication system 100. A first apparatus (communication device) 110 and a second apparatus (communication device) 120 are coupled to a wired communication link 130 for exchanging data with each other. The wired communication link 130 comprises a plurality of metallic wires (e.g. one or more pairs of wires) such as copper wires for coupling the first apparatus 110 and the second apparatus 120. For example, the plurality of wires may be implemented by one or more twisted wire pair cables and/or one or more coaxial cables.

The first apparatus 110 and the second apparatus 120 exchange UpStream (US) data and DownStream (DS) data with each other. In particular, the first apparatus 110 transmits the US data to the second apparatus 120 via the wired communication link 130, whereas the second apparatus 120 transmits the DS data to the first apparatus 110 via the wired communication link 130.

The first apparatus 110 and the second apparatus 120 perform an FDX data exchange. In other words, the first apparatus 110 and the second apparatus 120 concurrently (simultaneously) exchange the US data and the DS data.

The first apparatus 110 comprises transmit circuitry 111 for transmitting (configured to transmit) the US data over the wired communication link to the second apparatus 120. Analogously, the second apparatus 120 comprises transmit circuitry 121 for transmitting (configured to transmit) the DS data over the wired communication link to the first apparatus 110. The first apparatus 110 may, e.g., be a CPE located very near or within customer premises such as a house or an office building. The second apparatus 120 may, e.g., be a DPU. For example, the DPU may be coupled to a CO of a (tele-) communication provider via one or more optical fibers.

For FDX data exchange, the US data exchange takes place in the same frequency band (range) as the US data exchange. In other words, the transmission in both directions (DS and US) happens at the same time in the same frequency band. For example, the transmit circuitry 111 of the first apparatus 110 may be configured to transmit the US data in a predefined frequency band and the transmit circuitry 121 of the second apparatus 120 may be configured to transmit the DS data in the same predefined frequency band. For example, a bandwidth of the predefined frequency band may be more than 212 MHz. The bandwidth of the predefined frequency band may, e.g., be 424 MHz, 848 MHz or more. For US data transmission, the transmit circuitry 111 of the first apparatus 110 may use Discrete MultiTone (DMT) modulation (e.g. using using a single Inverse Discrete Fourier-Transformation, IDFT with k subcarriers of m×51.75 kHz subcarrier spacing, where k≥2 and m≥1). The transmit circuitry 121 of the second apparatus 120 may analogously use DMT modulation for DS data transmission. For example, the transmit circuitry 111 of the first apparatus 110 may be configured to transmit the US data in a first number of subcarriers of the predefined frequency band, and the transmit circuitry 121 of the second apparatus 120 may be configured to transmit the DS data in a different second number of subcarriers of the predefined frequency band.

The first apparatus 110 comprises receive circuitry 112 for receiving (configured to receive) the DS data over the wired communication link 130 from the second apparatus 120. Analogously, the second apparatus 110 comprises receive circuitry 122 for receiving (configured to receive) the US data over the wired communication link 130 from the first apparatus 110.

The first apparatus 110 and the second apparatus 120 perform the FDX US and DS data exchange in one or more frames for FDX data transmission. A frame is a cyclically repeated, logical data block for concurrent US and DS data exchange between the first apparatus 110 and the second apparatus 120 that consists of a fixed number of possible symbol positions (symbol slots) for US and DS data exchange in a predefined time interval. In the following various examples of frames will be described with reference to FIGS. 2 to 7 that enable power saving FDX data exchange between the first apparatus 110 and the second apparatus 120 over the wired communication link 130. 20. In the one or more frames, the first apparatus 110 is configured to transmit the DS data in the predefined frequency band that is concurrently used for the US data transmission by the second apparatus 120, and vice versa.

The below described frames have in common that each of the comprises a first subframe and a second subframe for DS data transmission as well as a third subframe and a fourth subframe for US data transmission. The first subframe and the fourth subframe are priority subframes such that the DS data exchange in the first subframe is prioritized over the US data exchange in the third subframe and the US data exchange in the fourth subframe is prioritized over the DS data exchange in the third subframe. Each of the first to fourth subframes comprises a respective operation interval (e.g. a discontinuous operation interval or a no transmission interval) during which at at least one possible symbol position (symbol slot) of the respective subframe no data symbol is exchanged. That is, the transmit circuitry 111 of the first apparatus 110 is configured to transmit no data symbol at at least one possible symbol position in the respective operation interval of each of the third subframe and the fourth subframe. Similarly, the transmit circuitry 121 of the second apparatus 120 is configured to transmit no data symbol at at least one possible symbol position in the respective operation interval of each of the first subframe and the second subframe.

Using a respective operation interval during which at at least one possible symbol position (symbol slot) of the respective subframe no data symbol is exchanged in each subframe of the frame for FDX data transmission may allow reduced power consumption for each of the first apparatus 110 and the second 120 as no data symbol is transmitted at at least one possible symbol position in the respective discontinuous operation interval.

Figure 2:
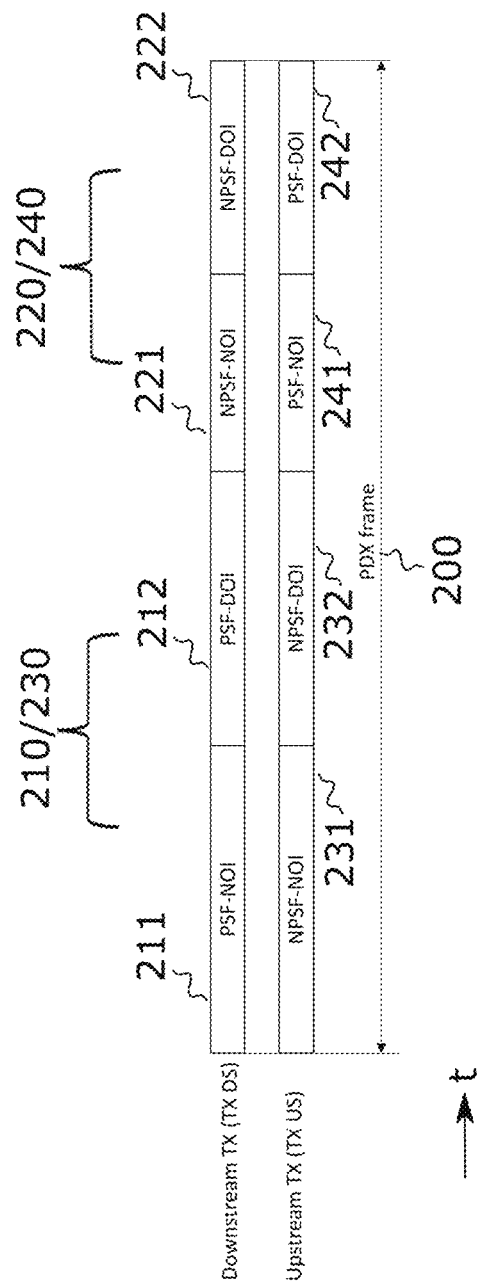
FIG. 2 illustrates a first example of a frame for FDX data transmission.

FIG. 2 illustrates a first exemplary (PHY duplexing, PDX) frame 200 for FDX data transmission. The frame 200 comprises a first subframe 210 and a second subframe 220 for DS data transmission (DS TX). Further, the frame 200 comprises a third subframe 230 and a fourth subframe 240 for US data transmission (US TX).

The DS data transmission over the wired communication link 130 in the first subframe 210 is prioritized over the concurrent US data transmission in the third subframe 230. The US data transmission over the wired communication link 130 in the fourth subframe 240 is prioritized over the concurrent DS data transmission in the second subframe 220. In other words, the first subframe 210 and the fourth subframe 240 are Priority SubFrames (PSFs), whereas the second subframe 220 and the third subframe 230 are Non-Priority SubFrames (NPSFs). During a PSF, the impact on the respective transmission direction from the respective other transmission direction is minimized. For example, during the corresponding NPSF of the other transmission direction, the transmit power of the other transmission direction may be reduced, a frequency range (spectrum) for the other transmission direction or any other parameter of the other transmission direction may be changed.

The first subframe 210 coincides with the third subframe 230 in time (time is indicated by the time axis t in FIG. 2). Further, the second subframe 220 coincides with the fourth subframe 240 in time. In other words, the boundaries of the PSFs and NPSFs are aligned in the example of FIG. 2. For example, the PSFs and NPSFs may be aligned in each wire of the wired communication link 230 in order to enable improved self-Near End Crosstalk (NEXT)- or echo-cancellation/mitigation. Further, the PSFs and NPSFs may be aligned between all wires of the wired communication link 230 in order to enable improved Far End Crosstalk (FEXT) and NEXT cancellation/mitigation.

Each of the first subframe 210 and the second subframe 220 comprises a respective continuous operation interval 211, 221 during which data symbols are transmitted at each possible symbol position (symbol slot) of the respective subframe 210, 220 by the transmit circuitry 121 of the second apparatus 120. A continuous operation interval may also be referred to as a "Normal Operation Interval (NOI)" according to some examples. Further, each of the first subframe 210 and the second subframe 220 comprises a respective Discontinuous Operation Interval (DOI) 212, 222 during which no data symbol is transmitted at at least one possible symbol position of the respective subframe by the transmit circuitry 121 of the second apparatus 120.

Analogously, each of the third subframe 230 and the fourth subframe 230 comprises a respective continuous operation interval 231, 241 during which data symbols are transmitted at each possible symbol position of the respective subframe 230, 240 by the transmit circuitry 111 of the first apparatus 110. Further, each of the third subframe 230 and the fourth subframe 230 comprises a respective discontinuous operation interval 232, 242 during which no data symbol is transmitted at at least one possible symbol position of the respective subframe by the transmit circuitry 111 of the first apparatus 110.

In the example of FIG. 2, boundaries between the respective continuous operation interval and the respective discontinuous operation interval of the first subframe and the third subframe 230 are aligned in time. Further, boundaries between the respective continuous operation interval and the respective discontinuous operation interval of the second subframe 220 and the fourth subframe 240 are aligned in time. In other words, the continuous operation intervals 211 and 231 of the first and third subframes 210 and 230 coincide with each other, the discontinuous operation intervals 212 and 232 of the first and third subframes 210 and 230 coincide with each other, the continuous operation intervals 221 and 241 of the second and fourth subframes 220 and 240 coincide with each other and the discontinuous operation intervals 222 and 242 of the second and fourth subframes 220 and 240 coincide with each other.

By defining a continuous operation interval and a discontinuous operation interval in each subframe (PSF and NPSF for US and DS), discontinuous operation may be used for FDX data transmission. While there are no transmission gaps in the continuous operation interval, there are one or more transmission gaps in the discontinuous operation interval. In other words, at least some of the possible symbol positions are not used in the discontinuous operation interval for data transmission. In some examples, even no transmission may take place in the respective discontinuous operation interval (i.e. no signal is transmitted). For example, instead of a data symbol a quiet symbol (silent symbol), an idle symbol, an acknowledgement symbol, a pre-compensation symbol, no signal or combinations thereof may be transmitted during the respective discontinuous operation interval at at least one possible symbol position of the respective subframe. A data symbol is symbol that carries user data. A quiet symbol is a symbol that results in zero transmit power at the wired communication link 230. A quiet symbol may be understood as a symbol that transmits no power as data. That is, the respective transmit circuitry does effectively not transmit data when sending quiet symbols. An idle symbol is a symbol that encodes a predefined default value (e.g. zero). An acknowledgement symbol is a symbol that indicates a reception acknowledgement for data received from a recipient of the acknowledgment symbols. A pre-compensation symbol is a symbol that indicates pre-compensation data for a recipient of the pre-compensation symbols for crosstalk compensation. For example, one or more of at least one quiet symbol, at least one symbol that transmits no power as data or no signal may be transmitted in the respective discontinuous operation interval of at least one of the first to fourth subframes.

Sending no data symbol during the respective discontinuous operation interval at at least one possible symbol position of the respective subframe allows to save power. For example, when no data is available for transmission, the respective discontinuous operation may allow to reduce power consumption.

The synchronization in time of the continuous operation intervals and discontinuous operation intervals between the subframes 210, 220, 230 and 240 may allow NEXT- , FEXT- and local echo cancellation in FDX data transmission. In particular, synchronized boundaries between the continuous operation intervals and the discontinuous operation intervals in opposite transmission directions may allow to keep a residual crosstalk (NEXT or FEXT) and a residual echo constant during the respective continuous operation interval. However, the division of the subframes 210, 220, 230 and 240 into the respective continuous operation interval and the respective discontinuous operation interval depends on the traffic in the other transmission direction. If a larger continuous operation interval is required in one transmission direction (e.g. US), keeping the same size for the continuous operation interval in the opposite transmission direction may require sending dummy information bits (dummy data units) or pre-compensation symbols for supporting vectoring during the continuous operation interval. This is not efficient and, hence, disadvantageous.

Figure 3:
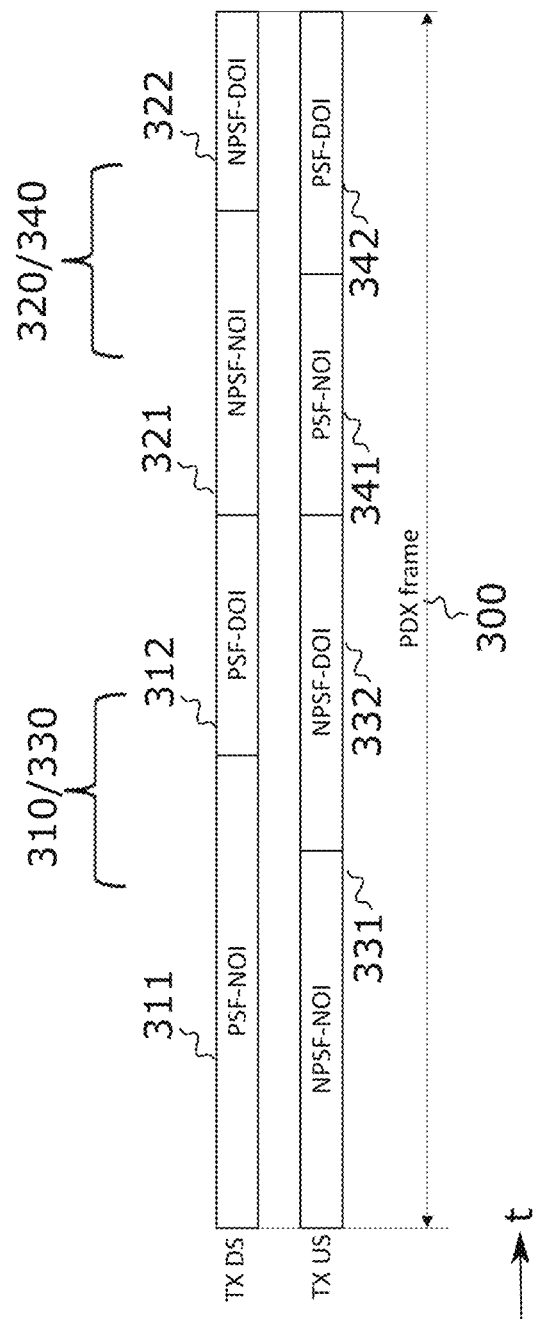
FIG. 3 illustrates a second example of a frame for FDX data transmission.

Another (PDX) frame 300 taking into account the above findings is illustrated in FIG. 3. The frame 300 comprises a first subframe 310 and a second subframe 320 for DS data transmission. Further, the frame 300 comprises a third subframe 330 and a fourth subframe 340 for US data transmission. The first subframe 310 and the fourth subframe 340 of the frame 300 are PSFs. The second subframe 320 and the third subframe 330 of the frame 300 are NPSFs. The first subframe 310 coincides with the third subframe 330 in time. Further, the second subframe 320 coincides with the fourth subframe 340 in time.

In the example of FIG. 3, the continuous operation intervals and the discontinuous operation intervals in the subframes for the opposite transmission directions are not aligned in time. In particular, the continuous operation interval 311 of the first subframe 310 partially overlaps in time with the discontinuous operation interval 332 of the third subframe 330. Similarly, the continuous operation interval 321 of the second subframe 320 partially overlaps in time with the discontinuous operation interval 342 of the fourth subframe 340.

In other examples, the continuous operation interval 331 of the third subframe 330 may partially overlap in time with the discontinuous operation interval 312 of the first subframe 310. Similarly, the continuous operation interval 341 of the fourth subframe 340 may partially overlap in time with the discontinuous operation interval 322 of the second subframe 320. In other words, the continuous operation interval of one of the first subframe 310 and the third subframe 330 may partially overlap in time with the discontinuous operation interval of the other one of the first subframe 310 and the third subframe 330. Similarly, the continuous operation interval of one of the second subframe 320 and the fourth subframe 340 may partially overlap in time with the discontinuous operation interval of the other one of the second subframe 320 and the fourth subframe 340.

In the frame 300, the continuous operation intervals and the discontinuous operation interval of the subframes for the opposite transmission directions are not in synchronization. Accordingly, the settings of the continuous operation interval's channel capacity in one transmission direction is not influenced by the continuous operation interval's channel capacity in the other transmission direction. For example, if there's a lot of data to transmit in one transmission direction (e.g. DS), there may be fewer data for transmission in the other transmission direction (e.g. US) such that a longer discontinuous operation interval may be used for the other transmission direction.

As described above, there is an overlap in time between the continuous operation intervals in one transmission direction with the discontinuous operation intervals of the other transmission direction (e.g. the discontinuous operation interval 332 for US transmission in the NPSF 330 affects the continuous operation interval 311 for DS transmission in the PSF 310 in FIG. 3). However, NEXT from a discontinuous operation interval for one transmission direction affects a continuous operation interval for the other transmission direction less than NEXT from a continuous operation interval for the one transmission direction affects the continuous operation interval for the other transmission direction because during the continuous operation interval transmission of the other transmission direction, the transmission in the discontinuous operation interval of the one transmission direction is interrupted. Accordingly, the Signal-to-Noise Ration (SNR) for the continuous operation interval transmission for the other transmission direction will be higher during the overlap in time with the discontinuous operation interval of the opposite transmission direction than during a time span where the continuous operation intervals for the opposite transmission directions overlap. For example, there is less crosstalk from the discontinuous operation interval 332 for US transmission in the NPSF 330 into the continuous operation interval 311 for DS transmission in the PSF 310 than from the continuous operation interval 331 for US transmission in the NPSF 330 into the continuous operation interval 311 for DS transmission in the PSF 310.

The NEXT from a continuous operation interval into a discontinuous operation interval is stronger than from a discontinuous operation interval into another discontinuous operation interval. For example, a case in which a continuous operation interval of an NPSF generates NEXT in a discontinuous operation interval of a PSF (e.g. the continuous operation interval 321 in the NPSF 320 for DS data transmission crosstalks into the discontinuous operation interval 342 in the PSF 340 for US data transmission in the example of FIG. 3) may be considered. Although the NEXT caused by a discontinuous operation interval of a PSF may be statistically weaker compared to NEXT from continuous operation interval due to the transmission gaps in the discontinuous operation interval, the peak value of the NEXT is likely the same. Accordingly, no additional performance loss is to be expected. Therefore, an overlap between a continuous operation interval of one transmission direction and discontinuous operation interval from another direction may be used.

Regarding the US NPSF 330, the second apparatus 120 (e.g. a DPU) may apply NEXT/echo cancellation. Although NEXT/echo cancellation is applied, a residual NEXT/echo may still be non-zero and may be taken in account to evaluate US performance during the US NPSF 330. For example, if no DS transmission occurs during the discontinuous operation interval 312 of the PSF 310 for DS data transmission, an extra (improved) SNR may be expected at the US receiver (i.e. the second apparatus 120).

For FDX, two major cases may be considered: 1) FDX without vectoring, and 2) FDX with vectoring.

Figure 4:
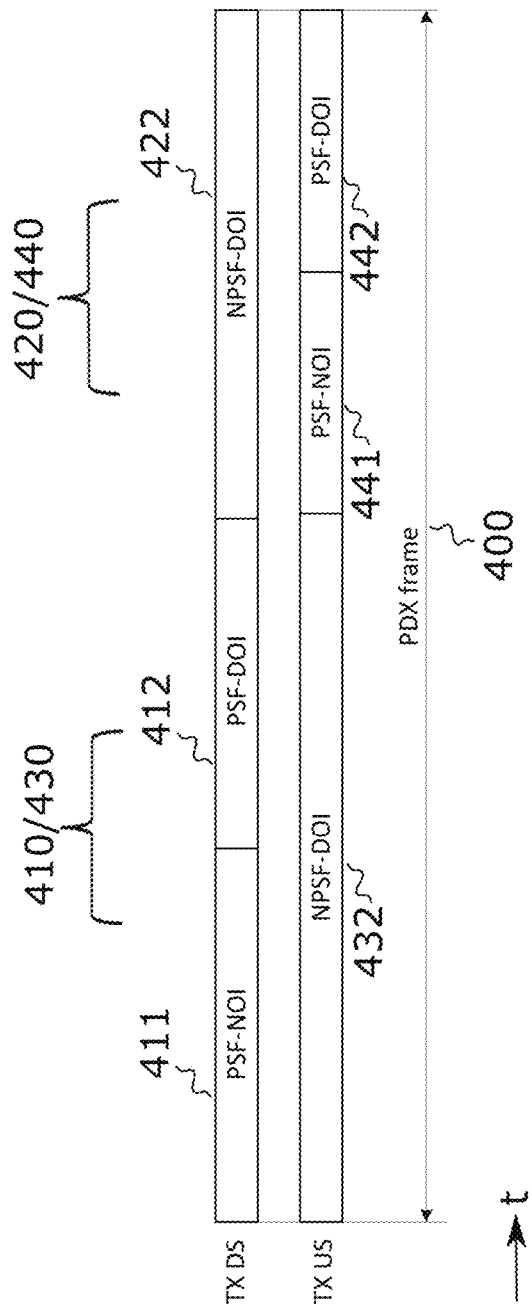
FIG. 4 illustrates a third example of a frame for FDX data transmission.

An exemplary third (PDX) frame 400 for FDX data transmission without vectoring is illustrated in FIG. 4. Without vectoring, there is a flexibility to allocate data symbols in the discontinuous operation intervals at any position. Therefore, the discontinuous operation intervals are defined over the entire NPSFs in the example of FIG. 4. For example, the frame 400 may be used for low crosstalk environments (e.g. if the wired communication link 130 is implemented by coaxial cables).

The frame 400 comprises a first subframe 410 and a second subframe 420 for DS data transmission. Further, the frame 400 comprises a third subframe 430 and a fourth subframe 440 for US data transmission. In the example of FIG. 4, the first subframe 410 for DS data transmission and the fourth subframe 440 for US data transmission are again PSFs. The second subframe 420 for DS data transmission and the third subframe 430 for US data transmission are NPSFs. The first subframe 410 coincides with the third subframe 430 in time. Further, the second subframe 420 coincides with the fourth subframe 440 in time.

The first subframe 410 and the fourth subframe 440 both comprise a respective continuous operation interval 411, 441 and a respective discontinuous operation interval 412, 442. The second subframe 420 and the third subframe 430 comprise only the respective discontinuous operation interval 422, 432. Neither the second subframe 420 nor the third subframe 430 comprise a continuous operation interval.

For example, in the G.mgfast standard currently defined by the International Telecommunication Union (ITU), the frame structure 400 may be adjusted using the parameter "TR", which determines the position of the boundary between the respective continuous operation interval and the respective discontinuous operation interval in the PSF and NPSF of each transmission direction. If the value of TR(NPSF) is zero, the boundary between the continuous operation interval and the discontinuous operation interval in the NPSF is at zero, i.e., no continuous operation interval is used in the NPSF. If the value of TR(NPSF) >0 and the value of TR(PSF)=PSF, the boundary between the continuous operation interval and the discontinuous operation interval in the NPSF is at a position higher than, i.e., a continuous operation interval and a discontinuous operation interval are used in the NPSF. Further, the boundary between the continuous operation interval and the discontinuous operation interval in the PSF is at the maximum position in the PSF, i.e., no discontinuous operation interval is used in the PSF. The value of the parameter "TR" may be changed for each frame independently for the US and the DS transmission. For delay sensitive applications, acknowledgment symbols (e.g. for the Robust Return Channel, RRC defined in G.mgfast) may exchanged at at least part of possible symbol positions in the respective discontinuous operation interval of the second subframe 420 and the third subframe 430 rather than quiet symbols.

In case, the transmit circuitry 121 of the second apparatus 120 is configured to transmit acknowledgment symbols at at least part of possible symbol positions during the discontinuous operation interval 422 of the second subframe 422, it may indicate a reception acknowledgement for US data received from a recipient of the acknowledgment symbols, i.e. for US data received from the first apparatus 110. That is, the acknowledgment symbols exchanged in the second subframe 420 indicate a data reception acknowledgement for the US data exchange. Similarly, in case, the transmit circuitry 111 of the first apparatus 111 is configured to transmit acknowledgment symbols at at least part of possible symbol positions during the discontinuous operation interval 432 of the third subframe 430, it may indicate a reception acknowledgement for DS data received from a recipient of the acknowledgment symbols, i.e. for DS data received from the second apparatus 120. That is, the acknowledgment symbols exchanged in the third subframe 430 indicate a data reception acknowledgement for the DS data exchange.

For example, in G.mgfast, the RRC may be modulated on few dedicated tones of a data symbol to deliver acknowledgement to the transmitting side of data reception on the receiving side. Using acknowledgment symbols such as the RRC may allow fast retransmission of data received in error, which is critical for delay-sensitive applications. An acknowledgment symbols such as an RRC symbol is a symbol that communicates only an acknowledgment, but no data (i.e., only tones loaded with acknowledgment/RRC are active). The use of acknowledgment symbols such as the RRC symbols may allow to save transmit power and allow communication of acknowledgement during a discontinuous operation interval instead of a quiet symbol. FDX data transmission may allow an increased bit rate, but another important aspect may be reducing the roundtrip delay in case of retransmission in order to comply with strict latency requirements (e.g. a latency as low as 0.5 μs may be associated with rather low packet error requirements). To reduce latency, the acknowledgment symbols such as the RRC symbols defined in the G.mgfast standard may be used as they effectively allow to minimize the roundtrip delay In some other examples, a respective small continuous operation interval may be used for the NPSFs for, e.g., measurement/testing purposes (e.g., SNR measurement or performance estimation during the discontinuous operation interval of the NPSF). The minimum size of the continuous operation interval may, e.g., be determined by the parameter "MINDSHOI" for the PSF, the NPSF or both in the G.mgfast standard. In this example, also the second subframe 420 and the third subframe 430 comprise a respective small/short continuous operation interval such that the continuous operation interval of the first subframe 410 partially overlaps in time with the discontinuous operation interval of the third subframe 430 and that the continuous operation interval of the fourth subframe 440 partially overlaps in time with the discontinuous operation interval of the second subframe 420. For example, the transmit circuitry 121 of the second apparatus 120 may be configured to transmit less than five, four, three or two (data) symbols in the continuous operation interval of the second subframe 420. Similarly, the transmit circuitry 111 of the first apparatus 111 may be configured to transmit less than five, four, three or two (data) symbols in the continuous operation interval of the third subframe 430. In other words, the respective continuous operation interval of each of the second subframe 420 and the third subframe 430 may comprise less than five, four, three or two symbol positions (slots).

Figure 5:
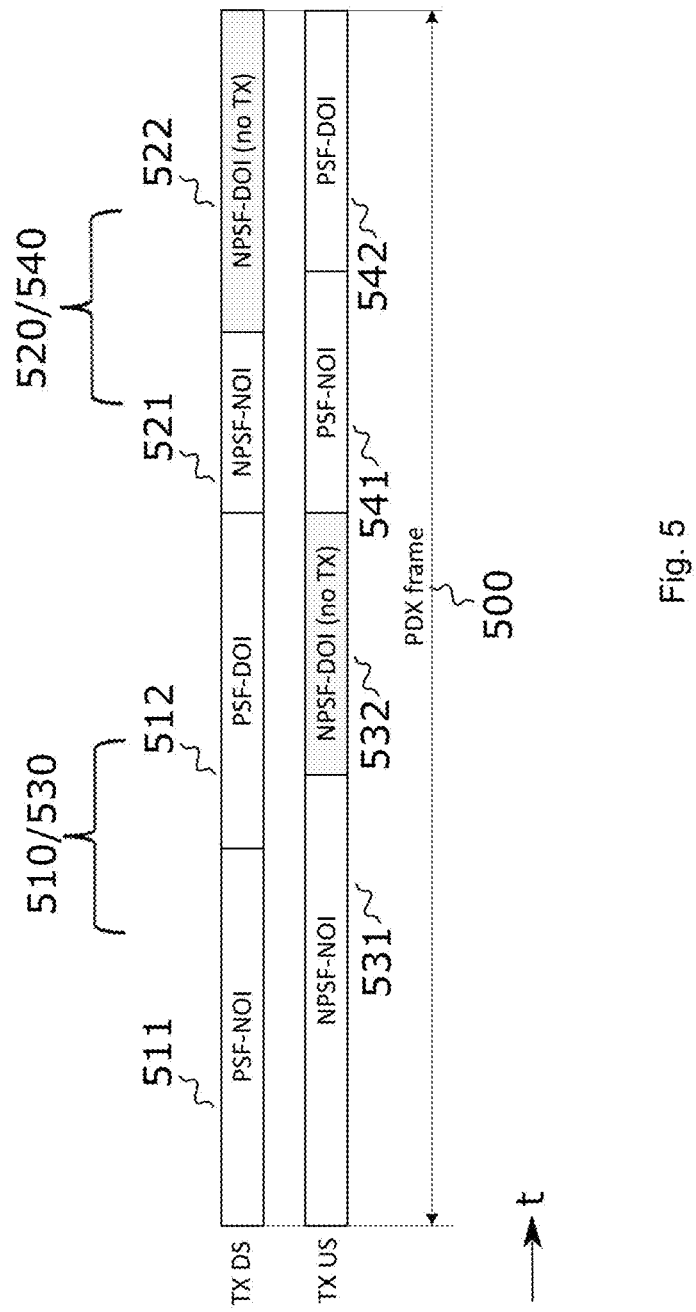
FIG. 5 illustrates a fourth example of a frame for FDX data transmission.

An exemplary fourth (PDX) frame 500 for FDX data transmission with vectoring is illustrated in FIG. 5. For example, the frame 500 may be used for crosstalk environments (e.g. if the wired communication link 130 is a multi-pair binder). The frame 500 comprises a first subframe 510 and a second subframe 520 for DS data transmission. Further, the frame 500 comprises a third subframe 530 and a fourth subframe 540 for US data transmission. The first subframe 510 coincides with the third subframe 530 in time. Further, the second subframe 520 coincides with the fourth subframe 540 in time.

With vectoring, the lines/wires of the wired communication link 130 are coordinated during continuous and discontinuous operation intervals. Further, the set of subcarriers (e.g. high-frequency subcarriers) used during a NPSF, in both US and DS, may be reduced compared to a PSF due to NEXT. The US transmit Power Spectral Density (PSD) during a NPSF is expected to be lower than during PSF. FEXT is assumed as the main disturber in the US (since NEXT/echo may be cancelled at the second apparatus 120, e.g., a DPU). The DS transmit PSD during a NPSF may be assumed to be the same as during a PSF. NEXT is assumed as the main disturber in the DS (since NEXT from other CPEs cannot be cancelled). The DS capacity during a NPSF is much smaller than in a PSF. The same is likely for the US (unless the number of NPSF symbols is much bigger than PSF symbols).

With this in mind, each of the first to fourth subframes 510, 520, 530 and 540 of the frame 500 comprises a respective continuous operation interval 511, 521, 531, 541 and a respective discontinuous operation interval 512, 522, 532, 542. The first subframe 510 and the fourth subframe 540 are PSFs. The second subframe 520 and the third subframe 530 are NPSFs. The respective continuous operation interval of each of the first to fourth subframes 510,520, 530 and 540 extends only over part of the respective subframe.

The continuous operation interval 531 of the third subframe partially overlaps in time with the discontinuous operation interval 512 of the first subframe 510. The continuous operation interval 541 of the fourth subframe 540 partially overlaps in time with the discontinuous operation interval 522 of the second subframe 520.

In other examples, the continuous operation interval 511 of the first subframe 510 may partially overlap in time with the discontinuous operation interval 532 of the third subframe 530. Similarly, the continuous operation interval 521 of the second subframe 520 may partially overlap in time with the discontinuous operation interval 542 of the fourth subframe 540. In other words, the continuous operation interval of one of the first subframe 510 and the third subframe 530 may partially overlap in time with the discontinuous operation interval of the other one of the first subframe 510 and the third subframe 530. Similarly, the continuous operation interval of one of the second subframe 520 and the fourth subframe 540 may partially overlap in time with the discontinuous operation interval of the other one of the second subframe 520 and the fourth subframe 540.

In the example of FIG. 5, no DS data exchange takes place in the discontinuous operation interval of the second subframe 520, and no US data exchange takes place in the discontinuous operation interval of the third subframe 530. That is, the transmit circuitry 121 of the second apparatus 120 is configured to not transmit data in the discontinuous operation interval 522 of the second subframe 520. Similarly, the transmit circuitry 111 of the first apparatus 110 is configured to not transmit data in the discontinuous operation interval 532 of the third subframe 530. In other words, no signal is transmitted in the US direction over the wired communication link in the discontinuous operation interval 522 of the second subframe 520, whereas no signal is transmitted in the DS direction over the wired communication link in the discontinuous operation interval 532 of the third subframe 530.

In other words, only a continuous operation interval is used in the DS-NPSF for DS data transmission. No DS data transmission takes place in the discontinuous operation interval of the NPSF. This is because NEXT is the main disturber and coordination in the discontinuous operation interval is not effective. Similarly, only a continuous operation interval is used in the US-NPSF for US data transmission. No US data transmission takes place in the discontinuous operation interval of the NPSF. This is because FEXT cancellation is effective.

In the example, of FIG. 5, the second subframe 520 comprises effectively a continuous operation interval 521 and a no transmission interval 522 (during which no data, i.e. no signal or only quiet symbols, are transmitted by the transmit circuitry 121 of the second apparatus 120). Similarly, the third subframe 530 comprises effectively a continuous operation interval 531 and a no transmission interval 532 (during which no data, i.e. no signal or only quiet symbols, are transmitted by the transmit circuitry 111 of the first apparatus 110). In other words, the transmit circuitry 121 of the second apparatus 120 is configured to not transmit over the wired communication link 130 in the no transmission interval of the NPSF 520 for DS data transmission, whereas the transmit circuitry 111 of the first apparatus 110 is configured to not transmit over the wired communication link 130 in the no transmission interval of the NPSF 530 for US data transmission. In still other words, the transmit circuitry 121 of the second apparatus 120 is configured to end transmission over the wired communication link 130 in the NPSF 520 for DS data transmission at the end of the continuous operation interval 521, whereas the transmit circuitry 111 of the first apparatus 110 is configured to end transmission over the wired communication link 130 in NPSF 530 for US data transmission at the end of the continuous operation interval 531.

The usage of the no transmission intervals 522 and 532 as illustrated in FIG. 5 may be enabled and disabled in the first apparatus 110 and the second apparatus 120, respectively (e.g. on demand or dynamically). For example, if the usage of the no transmission interval 532 in the first apparatus 110 and/or the usage of the no transmission interval 522 in the second apparatus 120 is disabled, a discontinuous operation interval as described herein or any other type of operation interval may be used instead in the respective NPSF.

The continuous operation interval in the respective NPSF enables to employ vectoring for crosstalk avoidance during the discontinuous operation interval of the respective NPSF. This is different from the above described frame 400 for crosstalk-free environment, in which full time transmission could be done during the discontinuous operation interval of the respective NPSF, if necessary.

In the G.mgfast standard, the setting of the parameter TR(NPSF) to zero may be valid for the frame 500, which corresponds to no data transmission in the respective NPSF.

In other examples, only acknowledgement symbols such RRC symbols are transmitted during the discontinuous operation interval of the respective NPSF. That is, no data symbols for the DS data exchange are exchanged during the discontinuous operation interval of the second subframe 520, and no data symbols for the US data exchange are exchanged during the discontinuous operation interval of the third subframe 530. However, during the discontinuous operation intervals of the second subframe 520 and the third subframe 530, acknowledgment symbols are exchanged at at least part of possible symbol positions of the second subframe 520 and the third subframe 530. For example, the transmit circuitry 121 of the second apparatus 120 may be configured to only transmit acknowledgment symbols in the discontinuous operation interval of the second subframe 520 in order to indicate a reception acknowledgement for US data received from a recipient of the acknowledgment symbols, i.e. for US data received from the first apparatus 110. Similarly, the transmit circuitry 111 of the first apparatus 111 may be configured to only transmit acknowledgment symbols in the discontinuous operation interval of the third subframe 530 in order to indicate a reception acknowledgement for DS data received from a recipient of the acknowledgment symbols, i.e. for DS data received from the second apparatus 120. Transmitting acknowledgment symbols (such as RRC symbols in the G.mgfast standard) may allow fast retransmission of data received in error, which is critical for delay-sensitive applications.

In case of delay-sensitive services and vectoring applied, the acknowledgment symbols (such as RRC symbols) may include, besides the tones carrying acknowledgment bits, also other tones carrying vectoring pre-compensation signals. These signals may enable to compensate secondary crosstalk that appears when a vectored line/wire turns off its transmission. In other words, the acknowledgment symbols may additionally indicate pre-compensation data for a recipient of the acknowledgment symbols for crosstalk compensation.

If reception acknowledgement for received data is not required, pre-compensation symbols may be exchanged instead of the symbols. For example, in the G.mgfast standard, the RRC symbols carrying vectoring pre-compensation data may be replaced with idle signals (containing pre-compensation signals only) if the RRC channel is not required. For example, the transmit circuitry 121 of the second apparatus 120 may be configured to only transmit pre-compensation symbols in the discontinuous operation interval of the second subframe 520 in order to indicate pre-compensation data for a recipient of the pre-compensation symbols (i.e. the first apparatus 110) for crosstalk compensation. Similarly, the transmit circuitry 111 of the first apparatus 111 may be configured to only transmit pre-compensation symbols in the discontinuous operation interval of the third subframe 530 in order to indicate pre-compensation data for a recipient of the pre-compensation symbols (i.e. the second apparatus 120) for crosstalk compensation.

Figure 6:
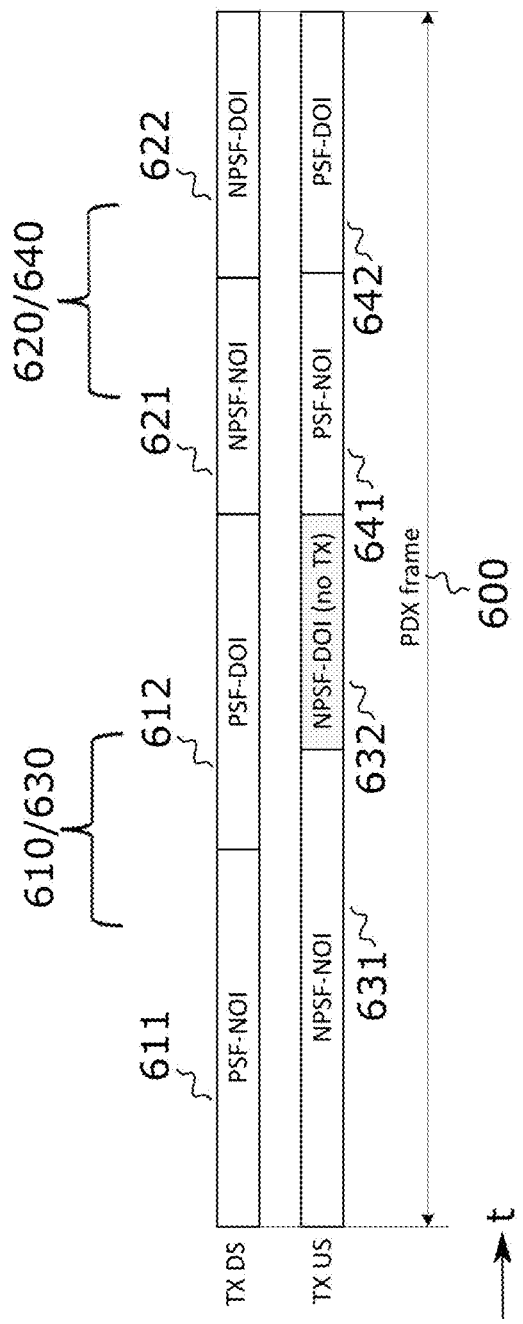
FIG. 6 illustrates a fifth example of a frame for FDX data transmission.

An exemplary fifth (PDX) frame 600 for FDX data transmission with vectoring is illustrated in FIG. 6. For example, the frame 600 may be used in a crosstalk (NEXT and/or FEXT) avoidance mode. The frame 600 comprises a first subframe 610 and a second subframe 620 for DS data transmission. Further, the frame 600 comprises a third subframe 630 and a fourth subframe 640 for US data transmission. The first subframe 610 and the fourth subframe 640 of the frame 600 are PSFs. The second subframe 620 and the third subframe 630 of the frame 600 are NPSFs. The first subframe 610 coincides with the third subframe 630 in time. Further, the second subframe 620 coincides with the fourth subframe 640 in time.

In FDX transmission, NEXT/echo can be cancelled at the US receiver, but not at the DS receiver, because the DS NEXT is coming from a non-collocated CPE. In the example of FIG. 6, the US and DS transmissions are both coordinated during the discontinuous operation interval for the DS NPSF (which corresponds to the continuous operation interval for the US PSF). With this arrangement FEXT and NEXT are both avoided at the DS receiver side during the discontinuous operation interval for the DS NPSF.

Each of the first subframe 610, the second subframe 620, the third subframe 630 and the fourth subframe 640 comprises a respective continuous operation interval 611, 621, 631, 641 and a respective discontinuous operation interval 612, 622, 632, 642.

In the example of FIG. 6, the continuous operation interval 631 of the third subframe 630 partially overlaps in time with the discontinuous operation interval 612 of the first subframe 610. In other examples, the continuous operation interval 611 of the first subframe 610 may partially overlap in time with the discontinuous operation interval 632 of the third subframe 630. In other words, the continuous operation interval of one of the first subframe 610 and the third subframe 630 may partially overlap in time with the discontinuous operation interval of the other one of the first subframe 610 and the third subframe 630.

No US data exchange takes place in the discontinuous operation interval 632 of the third subframe 630 similar to the example of FIG. 5. That is, the transmit circuitry 111 of the first apparatus 110 is configured to not transmit data in the discontinuous operation interval 632 of the third subframe 630.

Further, the boundary between the continuous operation interval 621 and the discontinuous operation interval 622 of the second subframe 620 is aligned in time with the boundary between the continuous operation interval 641 and the discontinuous operation interval 642 of the fourth subframe 640. In other words, the continuous operation interval 621 of the second subframe 620 coincides in time with the continuous operation interval 641 of the fourth subframe 640 and the discontinuous operation interval 622 of the second subframe 620 coincides in time with the discontinuous operation interval 642 of the fourth subframe 640.

In the US direction, NEXT during the NPSF 630 can be cancelled so that only FEXT avoidance/cancellation is needed at the US receiver during the discontinuous operation interval 612 of DS PSF 610. No alignment is needed between continuous operation interval 611 of the DS PSF 610 and the continuous operation interval 631 of the US PSF 630. Further, FEXT avoidance/cancellation may be performed at in the US direction during the discontinuous operation interval 642 of the US PSF 640. For this case, the discontinuous operation interval 622 of the DS NPSF 620 and the continuous operation interval 641 of the US PSF 640 are aligned.

Further, symbol positions used for DS data transmission and/or US data transmission may be coordinated. For example, for the time period of the discontinuous operation interval 622 of the DS NPSF 620, the following coordinated between lines/wires of the wired communication link may be used:
- all US lines/wires transmit in different symbol positions (slots) of the discontinuous operation interval 642 of the US PSF 640 in order to avoid mutual FEXT;
- all DS lines/wires transmit in the symbol slots of the discontinuous operation interval 622 of the DS NPSF 620 that are free from US transmission in order to avoid US NEXT;
- DS lines/wires may optionally avoid FEXT by not transmitting simultaneously;
- DS and US may both transmit full power on all available tones.

The US transmitter (e.g. a DPU) may determine US and DS symbol periods for crosstalk avoidance for both US and DS, and communicate the respective slots to all coupled US receivers (e.g. CPEs) for each frame 600 (e.g. a PDX frame).

For example, in the communication system of FIG. 1, the second apparatus 120 may comprise control circuitry 123 configured to assign possible symbol positions for US data transmission during the frame 600 to the other apparatus 110 coupled to the wired communication link 130. The possible symbol positions assigned to the first apparatus 110 may be indicated by the DS data transmitted from the second apparatus 120 to the first apparatus 110 via the wired communication link 130. In other words, the control circuitry 123 may assign possible symbol positions in the discontinuous operation interval 642 of the fourth subframe 640 to the other apparatus 110 for US data transmission from to the apparatus 110 to the apparatus 120 via the wired communication link 1130 during the frame 600. The transmit circuitry 121 of the second apparatus 120 transmits to the apparatus 110 data indicating the possible symbol positions assigned to the apparatus 110 via the DS data transmission.

Accordingly, the receive circuitry 112 of the first apparatus 110 may receive the DS data indicating the possible symbol positions assigned to the first apparatus 110 (for US data transmission in the discontinuous operation interval 642 of the fourth subframe 640) over the wired communication link 130. The transmit circuitry 111 of the first apparatus 110 may be configured to only transmit data symbols in the discontinuous operation interval 642 of the fourth subframe 640 at the possible symbol positions assigned to the apparatus. In other words, the receive circuitry 112 of the first apparatus 110 may receive via the DS data exchange data indicating possible symbol positions in the discontinuous operation interval 642 of the fourth subframe 640 that are assigned to the apparatus 110 for the US data exchange. During the discontinuous operation interval of the fourth subframe, the transmit circuitry 111 of the first apparatus 110 transmits data symbols for the US data exchange only at the possible symbol positions assigned to the apparatus 110.

Further, the transmit circuitry 121 of the second apparatus 120 may be configured to transmit data symbols during the discontinuous operation interval 622 of the second subframe 620 only at possible symbol positions of the second subframe 620 different from the possible symbol positions assigned to the first apparatus 110 for US data transmission in the fourth subframe 640. In other words, data symbols for the DS data exchange are exchanged during the discontinuous operation interval 622 of the second subframe 620 only at possible symbol positions of the second subframe 620 different from the possible symbol positions assigned to the apparatus 110.

On the other hand, the receive circuitry 112 of the first apparatus 110 may receive data symbols of the DS data only at possible symbol positions that are different from the possible symbol positions assigned to the apparatus for the discontinuous operation interval 642 of the fourth subframe 640.

In some examples, NEXT avoidance may be performed only in the upper frequency band regions, where NEXT is much stronger. The second apparatus 120 (e.g. a DPU) may order a NEXT measurement between connected CPEs (being exemplary implementations of the first apparatus 110) during initialization or using test symbols/tones during showtime and determine the frequencies or frequency band in which NEXT avoidance from a particular CPE is required. CPEs that generate low or no NEXT (due to particular line topology) on particular tones or all tones, may transmit full power and be excluded from the NEXT avoidance scheme.

Figure 7:
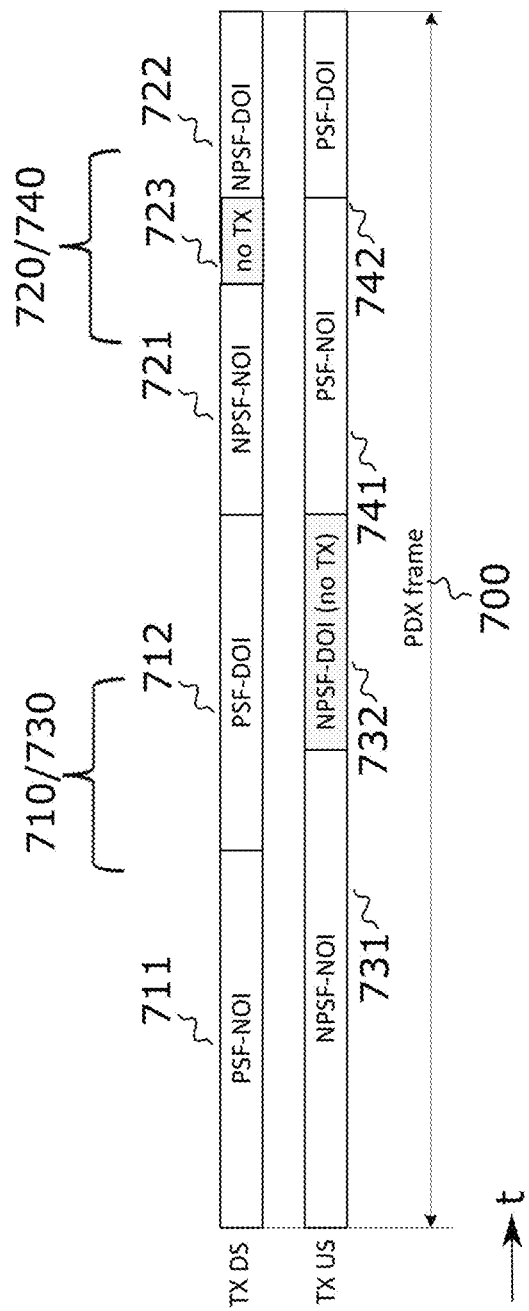
FIG. 7 illustrates a sixth example of a frame for FDX data transmission.

An exemplary sixth (PDX) frame 700 for FDX data transmission with vectoring is illustrated in FIG. 7. For example, the frame 700 may be used in a crosstalk (NEXT and/or FEXT) avoidance mode. The frame 700 comprises a first subframe 710 and a second subframe 720 for DS data transmission. Further, the frame 700 comprises a third subframe 730 and a fourth subframe 740 for US data transmission. The first subframe 710 and the fourth subframe 740 of the frame 700 are PSFs. The second subframe 720 and the third subframe 730 of the frame 700 are NPSFs. The first subframe 710 coincides with the third subframe 730 in time. Further, the second subframe 720 coincides with the fourth subframe 740 in time. Each of the first subframe 710, the second subframe 720, the third subframe 730 and the fourth subframe 740 comprises a respective continuous operation interval 711, 721, 731, 741 and a respective discontinuous operation interval 712, 722, 732, 742.

In some situations, it may desired to transmit certain traffic in the US PSF 640 (which requires a bigger/larger continuous operation interval), while not transmitting in the continuous operation interval 721 of the DS NPSF 740 (which may require sending dummy bytes to support vectoring). In case the boundaries between the continuous operation interval 721 of the DS NPSF 720 and the continuous operation interval 741 of the US PSF 740 are not synchronized, this may be achieved by using a no-transmission zone in the DS NPSF 720 according to the example of FIG. 7.

In the example of FIG. 7, the second subframe 720 comprises a no transmission interval 723 arranged between the continuous operation interval 721 and the discontinuous operation interval 722. The transmit circuitry 121 of the second apparatus 120 is configured to not transmit data in the no transmission interval 723 of the second subframe 720. In other words, no DS data exchange takes place in the no transmission interval 723 of the second subframe 720. A boundary between the continuous operation interval 741 and the discontinuous operation interval 742 of the fourth subframe 740 is aligned in time with a boundary between the no transmission interval 723 and the discontinuous operation interval 722 of the second subframe 720. That is, the discontinuous operation interval 742 of the fourth subframe 740 coincides in time with the discontinuous operation interval 722 of the second subframe.

In the example of FIG. 7, the continuous operation interval 731 of the third subframe 730 partially overlaps in time with the discontinuous operation interval 712 of the first subframe 710. In other examples, the continuous operation interval 711 of the first subframe 710 may partially overlap in time with the discontinuous operation interval 732 of the third subframe 730. In other words, the continuous operation interval of one of the first subframe 710 and the third subframe 730 may partially overlap in time with the discontinuous operation interval of the other one of the first subframe 710 and the third subframe 730. No US data exchange takes place in the discontinuous operation interval 732 of the third subframe 730. That is, the transmit circuitry 111 of the first apparatus 110 is configured to not transmit data in the discontinuous operation interval 732 of the third subframe 730.

The example of FIG. 7 may be understood as PDX frame using a discontinuous operation interval the US PSF for a FEXT & NEXT avoidance mode with no alignment between the continuous operation interval of the DS NPSF and the continuous operation interval of the US PSF.

The frame structures described herein may be used for various communication standards using FDX data transmission. For example, the proposed frame structures may be used for the G.mgfast standard currently defined by the ITU.

For further illustrating the proposed power saving FDX data exchange over a wired communication link, flowcharts of various exemplary methods for an apparatus coupleable to the wired communication link will be described in following with reference to FIGS. 8 to 13.

Figure 8:
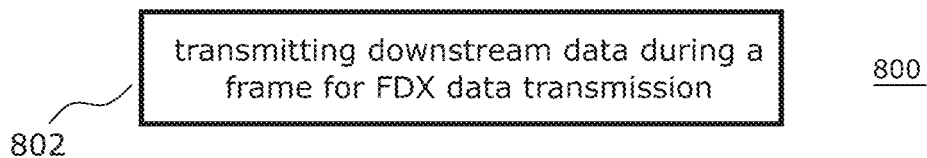
FIG. 8 illustrates a flowchart of a first example of a method for an apparatus coupleable to a wired communication link.

FIG. 8 illustrates a flowchart of a first method 800 for an apparatus coupleable to a wired communication link. The method comprises transmitting 802 DS data over the wired communication link during a frame for FDX data transmission. The frame comprises a first subframe and a second subframe for DS data transmission. The first subframe coincides in time with a third subframe of the frame for US data transmission, wherein the second subframe coincides in time with a fourth subframe of the frame for US data transmission. The first subframe and the fourth subframe are PSFs. The second subframe and the third subframe are NPSFs. Each of the first subframe and the fourth subframe comprises a respective discontinuous operation interval.

More details and aspects of the method 800 are explained in connection with the proposed technique or one or more examples described above (e.g. FIGS. 1 to 7). The method 800 may comprise one or more additional optional features corresponding to one or more aspects of the proposed technique or one or more examples described above.

Figure 9:
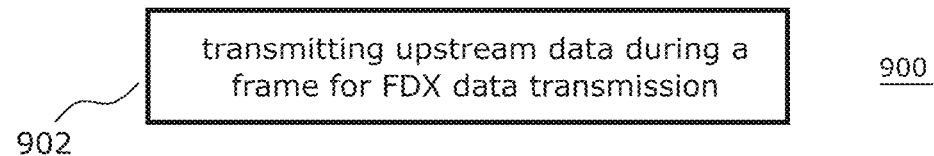
FIG. 9 illustrates a flowchart of a second example of a method for an apparatus coupleable to a wired communication link.

FIG. 9 illustrates a flowchart of a second method 900 for an apparatus coupleable to a wired communication link. The method 900 comprises transmitting 902 US data over the wired communication link during a frame for FDX data transmission. The frame comprises a first subframe and a second subframe for US data transmission. The first subframe coincides in time with a third subframe of the frame for DS data transmission, wherein the second subframe coincides in time with a fourth subframe of the frame for DS data transmission. The second subframe and the third subframe are PSFs. The first subframe and the fourth subframe are NPSFs. Each of the second subframe and the third subframe comprises a respective discontinuous operation interval.

More details and aspects of the method 900 are explained in connection with the proposed technique or one or more examples described above (e.g. FIGS. 1 to 7). The method 900 may comprise one or more additional optional features corresponding to one or more aspects of the proposed technique or one or more examples described above.

Figure 10:
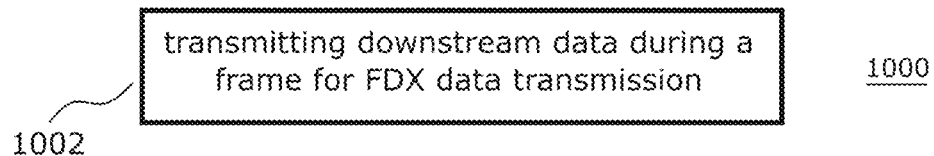
FIG. 10 illustrates a flowchart of a third example of a method for an apparatus coupleable to a wired communication link.

FIG. 10 illustrates a flowchart of a third method 1000 for an apparatus coupleable to a wired communication link. The method 1000 comprises transmitting 1002 DS data over the wired communication link during a frame for FDX data transmission. The frame comprises a PSF and a NPSF for DS data transmission, wherein the PSF for DS data transmission coincides in time with a NPSF of the frame for US data transmission, wherein the NPSF for DS data transmission coincides in time with a PSF of the frame for US data transmission. The NPSF for DS data transmission comprises a continuous operation interval and a no transmission interval. The apparatus does not transmit over the wired communication link in the no transmission interval of the NPSF for DS data transmission.

More details and aspects of the method 1000 are explained in connection with the proposed technique or one or more examples described above (e.g. FIG. 5). The method 1000 may comprise one or more additional optional features corresponding to one or more aspects of the proposed technique or one or more examples described above.

Figure 11:
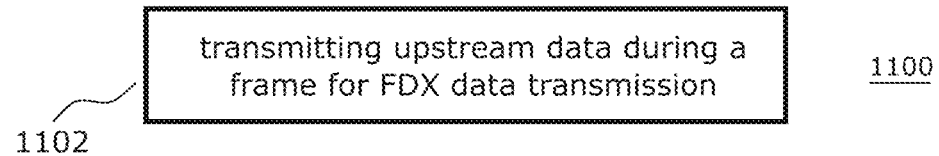
FIG. 11 illustrates a flowchart of a fourth example of a method for an apparatus coupleable to a wired communication link.

FIG. 11 illustrates a flowchart of a fourth method 1100 for an apparatus coupleable to a wired communication link. The method 1100 comprises transmitting 1102 US data over the wired communication link during a frame for FDX data transmission. The frame comprises a PSF and a NPSF for US data transmission. The PSF for US data transmission coincides in time with a NPSF of the frame for DS data transmission, wherein the NPSF for US data transmission coincides in time with a PSF of the frame for DS data transmission. The NPSF for US data transmission comprises a continuous operation interval and a no transmission interval. The apparatus does not transmit over the wired communication link in the no transmission interval of the NPSF for US data transmission.

More details and aspects of the method 1100 are explained in connection with the proposed technique or one or more examples described above (e.g. FIG. 5). The method 1100 may comprise one or more additional optional features corresponding to one or more aspects of the proposed technique or one or more examples described above.

Figure 12:
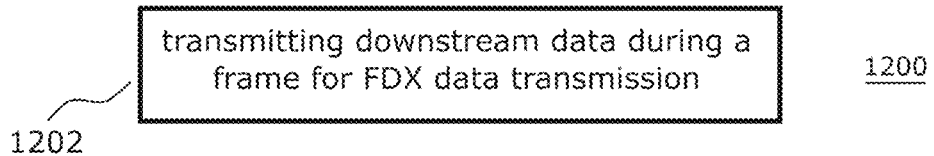
FIG. 12 illustrates a flowchart of a fifth example of a method for an apparatus coupleable to a wired communication link.

FIG. 12 illustrates a flowchart of a fifth method 1200 for an apparatus coupleable to a wired communication link. The method 1200 comprises transmitting 1202 DS data over the wired communication link during a frame for FDX data transmission. The frame comprises a PSF and a NPSF for DS data transmission, wherein the PSF for DS data transmission coincides in time with a NPSF of the frame for US data transmission, wherein the NPSF for DS data transmission coincides in time with a PSF of the frame for US data transmission. The NPSF for DS data transmission comprises a continuous operation interval. The continuous operation interval of the NPSF for DS data transmission extends only over part of the NPSF for DS data transmission. DS transmission over the wired communication link in the NPSF for DS data transmission ends at the end of the continuous operation interval.

More details and aspects of the method 1200 are explained in connection with the proposed technique or one or more examples described above (e.g. FIG. 5). The method 1200 may comprise one or more additional optional features corresponding to one or more aspects of the proposed technique or one or more examples described above.

Figure 13:
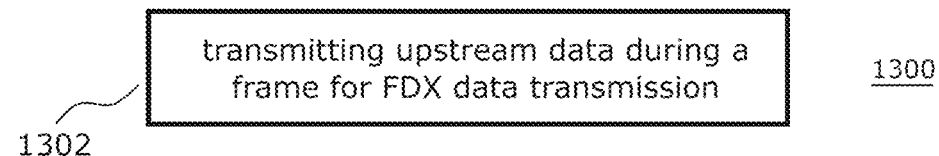
FIG. 13 illustrates a flowchart of a sixth example of a method for an apparatus coupleable to a wired communication link.

FIG. 13 illustrates a flowchart of a sixth method 1300 for an apparatus coupleable to a wired communication link. The method 1300 comprises transmitting 1302 US data over the wired communication link during a frame for FDX data transmission. The frame comprises a PSF and a NPSF for US data transmission. The PSF for US data transmission coincides in time with a NPSF of the frame for DS data transmission, wherein the NPSF for US data transmission coincides in time with a PSF of the frame for DS data transmission. The NPSF for US data transmission comprises a continuous operation interval. The continuous operation interval of the NPSF for US data transmission extends only over part of the NPSF for US data transmission. US transmission over the wired communication link in the NPSF for US data transmission ends at the end of the continuous operation interval.

More details and aspects of the method 1300 are explained in connection with the proposed technique or one or more examples described above (e.g. FIG. 5). The method 1300 may comprise one or more additional optional features corresponding to one or more aspects of the proposed technique or one or more examples described above.

The proposed technique may allow to apply discontinuous operation in FDX transmission.While the proposed technique may allow FEXT and NEXT/echo cancellation or avoidance, it does not limit the throughput in one transmission direction for power saving benefits in the other transmission direction. The above examples may be used in crosstalk free environment as well as in the presence of crosstalk. The proposed technique may facilitate crosstalk avoidance in the time domain as well as the frequency domain.

The proposed technique may allow power savings for the DPU and the CPE. It may allow to optimize traffic patterns and utilization of the backbone connection capability.

The examples described herein may be summarized as follows:

Example 1 is an apparatus for a wired communication link, the apparatus comprising transmit circuitry for transmitting downstream data over the wired communication link during a frame for full duplex data transmission, wherein the frame comprises a first subframe and a second subframe for downstream data transmission, wherein the first subframe coincides in time with a third subframe of the frame for upstream data transmission, wherein the second subframe coincides in time with a fourth subframe of the frame for upstream data transmission, wherein the first subframe and the fourth subframe are priority subframes, wherein the second subframe and the third subframe are non-priority subframes, and wherein each of the first subframe and the fourth subframe comprises a respective discontinuous operation interval.

Example 2 is the apparatus of example 1, wherein each of the first to fourth subframes further comprises a respective continuous operation interval.

Example 3 is the apparatus of example 1 or example 2, wherein each of the second subframe and the third subframe comprises a respective no transmission interval, wherein the transmit circuitry is configured to not transmit data over the wired communication link in the no transmission interval of the second subframe, and wherein no upstream data are transmitted in the no transmission interval of the third subframe.

Example 4 is the apparatus of example 2, wherein each of the second subframe and the third subframe comprises a respective discontinuous operation interval, wherein boundaries between the respective continuous operation interval and the respective discontinuous operation interval of the first subframe and the third subframe are aligned in time, and wherein boundaries between the respective continuous operation interval and the respective discontinuous operation interval of the second subframe and the fourth subframe are aligned in time.

Example 5 is the apparatus of example 2, wherein each of the second subframe and the third subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

Example 6 is the apparatus of example 5, wherein the continuous operation interval of the first subframe partially overlaps in time with the discontinuous operation interval of the third subframe, wherein the continuous operation interval of the fourth subframe partially overlaps in time with the discontinuous operation interval of the second subframe, and wherein the transmit circuitry is configured to transmit less than five symbols in the continuous operation interval of the second subframe.

Example 7 is the apparatus of example 5, wherein the transmit circuitry is configured to only transmit acknowledgment symbols in the discontinuous operation interval of the secand subframe, wherein only acknowledgment symbols are transmitted in the discontinuous operation interval of the third subframe, and wherein the acknowledgment symbols indicate a reception acknowledgement for data received from a recipient of the acknowledgment symbols.

Example 8 is the apparatus of example 7, wherein the acknowledgment symbols additionally indicate pre-compensation data for the recipient of the acknowledgment symbols for crosstalk compensation.

Example 9 is the apparatus of example 5, wherein the transmit circuitry is configured to only transmit pre-compensation symbols in the discontinuous operation interval of the second subframe, wherein only pre-compensation symbols are transmitted in the discontinuous operation interval of the third subframe, and wherein the pre-compensation symbols indicate pre-compensation data for a recipient of the pre-compensation symbols for crosstalk compensation.

Example 10 is the apparatus of example 2, wherein each of the second subframe and the third subframe comprises a respective discontinuous operation interval, wherein boundaries between the respective continuous operation interval and the respective discontinuous operation interval of the second subframe and the fourth subframe are aligned in time, wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

Example 11 is the apparatus of example 2, further comprising control circuitry configured to assign possible symbol positions for upstream data transmission in the frame to another apparatus coupled to the wired communication link, and wherein the downstream data indicate the possible symbol positions assigned to the other apparatus.

Example 12 is the apparatus of example 11, wherein each of the second subframe and the third subframe comprises a respective discontinuous operation interval, wherein the transmit circuitry is configured to transmit data symbols in the discontinuous operation interval of the second subframe only at possible symbol positions of the second subframe different from the possible symbol positions assigned to the other apparatus.

Example 13 is the apparatus of example 2, wherein each of the second subframe and the third subframe comprises a respective discontinuous operation interval, wherein the second subframe comprises a no transmission interval arranged between the continuous operation interval and the discontinuous operation interval, wherein the transmit circuitry is configured to not transmit data in the no transmission interval of the second subframe, wherein the discontinuous operation intervals of the second subframe and the fourth subframe coincide in time, wherein a boundary between the continuous operation interval and the discontinuous operation interval of the fourth subframe is aligned in time with a boundary between the no transmission interval and the discontinuous operation interval of the second subframe, and wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

Example 14 is the apparatus of example 1, wherein the second subframe and the third subframe comprise only a respective discontinuous operation interval.

Example 15 is the apparatus of example 14, wherein the transmit circuitry is configured to transmit acknowledgment symbols at at least part of possible symbol positions in the discontinuous operation interval of the second subframe, and wherein acknowledgment symbols are transmitted at at least part of possible symbol positions in the discontinuous operation interval of the third subframe, and wherein the acknowledgment symbols indicate a reception acknowledgement for upstream data received from a recipient of the acknowledgment symbols.

Example 16 is the apparatus of any of examples 1 to 6 or 10 to 15, wherein one or more of at least one quiet symbol, at least one symbol that transmits no power as data or no signal is transmitted in the respective discontinuous operation interval of at least one of the first to fourth subframes.

Example 17 is the apparatus of any of examples 1 to 16, further comprising receive circuitry for receiving the upstream data during the frame.

Example 18 is the apparatus of any of examples 1 to 17, wherein the wired communication link comprises a plurality of copper wires.

Example 19 is the apparatus of any of examples 1 to 18, wherein the transmit circuitry is configured to transmit the downstream data in a predefined frequency band that is concurrently used for the upstream data transmission in the frame.

Example 20 is a communication system, comprising: an apparatus according to any of examples 1 to 19; and a communication device coupled to the apparatus via a wired communication link, wherein the communication device comprises circuitry configured to perform one or more of the following: receive the downstream data during the frame; and transmit the upstream data during the frame.

Example 21 is a method for an apparatus coupleable to a wired communication link, the method comprising: transmitting downstream data over the wired communication link during a frame for full duplex data transmission, wherein the frame comprises a first subframe and a second subframe for downstream data transmission, wherein the first subframe coincides in time with a third subframe of the frame for upstream data transmission, wherein the second subframe coincides in time with a fourth subframe of the frame for upstream data transmission, wherein the first subframe and the fourth subframe are priority subframes, wherein the second subframe and the third subframe are non-priority subframes, and wherein each of the first subframe and the fourth subframe comprises a respective discontinuous operation interval.

Example 22 is the method of example 21, wherein each of the first to fourth subframes further comprises a respective continuous operation interval.

Example 23 is the method of example 21 or example 22, wherein each of the second subframe and the third subframe comprises a respective no transmission interval, wherein no downstream data are transmitted in the no transmission interval of the second subframe, and wherein no upstream data are transmitted in the no transmission interval of the third subframe.

Example 24 is the method of example 22, wherein each of the second subframe and the third subframe comprises a respective discontinuous operation interval, wherein boundaries between the respective continuous operation interval and the respective discontinuous operation interval of the first subframe and the third subframe are aligned in time, and wherein boundaries between the respective continuous operation interval and the respective discontinuous operation interval of the second subframe and the fourth subframe are aligned in time.

Example 25 is the method of example 22, wherein each of the second subframe and the third subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

Example 26 is the method of example 25, wherein the continuous operation interval of the first subframe partially overlaps in time with the discontinuous operation interval of the third subframe, wherein the continuous operation interval of the fourth subframe partially overlaps in time with the discontinuous operation interval of the second subframe, and wherein less than five symbols are transmitted in the continuous operation interval of the second subframe.

Example 27 is the method of example 25, wherein only transmit acknowledgment symbols are transmitted in the discontinuous operation interval of the second subframe, wherein only acknowledgment symbols are transmitted in the discontinuous operation interval of the third subframe, and wherein the acknowledgment symbols indicate a reception acknowledgement for data received from a recipient of the acknowledgment symbols.

Example 28 is the method of example 27, wherein the acknowledgment symbols additionally indicate pre-compensation data for the recipient of the acknowledgment symbols for crosstalk compensation.

Example 29 is the method of example 25, wherein only transmit pre-compensation symbols are transmitted in the discontinuous operation interval of the second subframe, wherein only pre-compensation symbols are transmitted in the discontinuous operation interval of the third subframe, and wherein the pre-compensation symbols indicate pre-compensation data for a recipient of the pre-compensation symbols for crosstalk compensation.

Example 30 is the method of example 22, wherein each of the second subframe and the third subframe comprises a respective discontinuous operation interval, wherein boundaries between the respective continuous operation interval and the respective discontinuous operation interval of the second subframe and the fourth subframe are aligned in time, wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

Example 31 is the method of example 22, further comprising: assigning possible symbol positions for upstream data transmission in the frame to another apparatus coupled to the wired communication link, wherein the downstream data indicate the possible symbol positions assigned to the other apparatus.

Example 32 is the method of example 31, wherein each of the second subframe and the third subframe comprises a respective discontinuous operation interval, wherein data symbols are transmitted in the discontinuous operation interval of the second subframe only at possible symbol positions of the second subframe different from the possible symbol positions assigned to the other apparatus.

Example 33 is the method of example 22, wherein each of the second subframe and the third subframe comprises a respective discontinuous operation interval, wherein the second subframe comprises a no transmission interval arranged between the continuous operation interval and the discontinuous operation interval, wherein no downstream data is transmitted in the no transmission interval of the second subframe, wherein the discontinuous operation intervals of the second subframe and the fourth subframe coincide in time, and wherein a boundary between the continuous operation interval and the discontinuous operation interval of the fourth subframe is aligned in time with a boundary between the no transmission interval and the discontinuous operation interval of the second subframe, and wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

Example 34 is the method of example 21, wherein the second subframe and the third subframe comprise only a respective discontinuous operation interval.

Example 35 is the method of example 34, wherein acknowledgment symbols are transmitted at least part of possible symbol positions in the discontinuous operation interval of the second subframe, and wherein acknowledgment symbols are transmitted at least part of possible symbol positions in the discontinuous operation interval of the third subframe, and wherein the acknowledgment symbols indicate a reception acknowledgement for upstream data received from a recipient of the acknowledgment symbols.

Example 36 is the apparatus of any of examples 21 to 26 or 30 to 35, wherein one or more of a quiet symbol, a symbol that transmits no power as data or no signal is transmitted in the respective discontinuous operation interval of at least one of the first to fourth subframes.

Example 37 is the method of any of examples 21 to 36, further comprising: receiving the upstream data during the frame.

Example 38 is the method of any of examples 21 to 37, wherein the wired communication link comprises a plurality of copper wires.

Example 39 is the method of any of examples 21 to 38, wherein the downstream data are transmitted in a predefined frequency band that is concurrently used for the upstream data transmission in the frame.

Example 40 is a communication method for communication system, wherein the communication system comprises an apparatus coupled to a communication device via a wired communication link, the method comprising: operating the apparatus according to the method of any of examples 21 to 39; and performing one or more of the following at the communication device: receiving the downstream data during the frame; and transmitting the upstream data during the frame.

Example 41 is an apparatus for a wired communication link, the apparatus comprising transmit circuitry for transmitting upstream data over the wired communication link during a frame for full duplex data transmission, wherein the frame comprises a first subframe and a second subframe for upstream data transmission, wherein the first subframe coincides in time with a third subframe of the frame for downstream data transmission, wherein the secand subframe coincides in time with a fourth subframe of the frame for downstream data transmission, wherein the second subframe and the third subframe are priority subframes, wherein the first subframe and the fourth subframe are non-priority subframes, and wherein each of the second subframe and the third subframe comprises a respective discontinuous operation interval.

Example 42 is the apparatus of example 41, wherein each of the first to fourth subframes further comprises a respective continuous operation interval.

Example 43 is the apparatus of example 41 or example 42, wherein each of the first subframe and the fourth subframe comprises a respective no transmission interval, wherein the transmit circuitry is configured to not transmit data over the wired communication link in the no transmission interval of the first subframe, and wherein no downstream data are transmitted in the no transmission interval of the fourth subframe.

Example 44 is the apparatus of example 42, wherein each of the first subframe and the fourth subframe comprises a respective discontinuous operation interval, wherein boundaries between the respective continuous operation interval and the respective discontinuous operation interval of the first subframe and the third subframe are aligned in time, and wherein boundaries between the respective continuous operation interval and the respective discontinuous operation interval of the second subframe and the fourth subframe are aligned in time.

Example 45 is the apparatus of example 42, wherein each of the first subframe and the fourth subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

Example 46 is the apparatus of example 45, wherein the continuous operation interval of the third subframe partially overlaps in time with the discontinuous operation interval of the first subframe, wherein the continuous operation interval of the second subframe partially overlaps in time with the discontinuous operation interval of the fourth subframe, and wherein the transmit circuitry is configured to transmit less than five symbols in the continuous operation interval of the first subframe.

Example 47 is the apparatus of example 45, wherein the transmit circuitry is configured to only transmit acknowledgment symbols in the discontinuous operation interval of the first subframe, wherein only acknowledgment symbols are transmitted in the discontinuous operation interval of the fourth subframe, and wherein the acknowledgment symbols indicate a reception acknowledgement for data received from a recipient of the acknowledgment symbols.

Example 48 is the apparatus of example 47, wherein the acknowledgment symbols additionally indicate pre-compensation data for the recipient of the acknowledgment symbols for crosstalk compensation.

Example 49 is the apparatus of example 45, wherein the transmit circuitry is configured to only transmit pre-compensation symbols in the discontinuous operation interval of the first subframe, wherein only pre-compensation symbols are transmitted in the discontinuous operation interval of the fourth subframe, and wherein the pre-compensation symbols indicate pre-compensation data for a recipient of the pre-compensation symbols for crosstalk compensation.

Example 50 is the apparatus of example 42, wherein each of the first subframe and the fourth subframe comprises a respective discontinuous operation interval, wherein boundaries between the respective continuous operation interval and the respective discontinuous operation interval of the second subframe and the fourth subframe are aligned in time, wherein the continuous operation interval of one of the first subframe and the third subframe partially overlaps in time with the discontinuous operation interval of the other one of the first subframe and the third subframe, and wherein the transmit circuitry is configured to not transmit data in the discontinuous operation interval of the first subframe.

Example 51 is the apparatus of example 42, further comprising receive circuitry for receiving the downstream data from the wired communication link, wherein the downstream data indicate possible symbol positions in the discontinuous operation interval of the second subframe that are assigned to the apparatus for the upstream data transmission, and wherein the transmit circuitry is configured to transmit data symbols in the discontinuous operation interval of the second subframe only at the possible symbol positions assigned to the apparatus.

Example 52 is the apparatus of example 52, wherein the receive circuitry is configured to receive data symbols of the downstream data only at possible symbol positions that are different from the possible symbol positions assigned to the apparatus in the discontinuous operation interval of the second subframe.

Example 53 is the apparatus of example 42, wherein each of the first subframe and the fourth subframe comprises a respective discontinuous operation interval, wherein the fourth subframe comprises a no transmission interval arranged between the continuous operation interval and the discontinuous operation interval, wherein no downstream data is transmitted in the no transmission interval of the fourth subframe, wherein the discontinuous operation intervals of the second subframe and the fourth subframe coincide in time, and wherein a boundary between the continuous operation interval and the discontinuous operation interval of the second subframe is aligned in time with a boundary between the no transmission interval and the discontinuous operation interval of the fourth subframe, and wherein the continuous operation interval of one of the first subframe and the third subframe partially overlaps in time with the discontinuous operation interval of the other one of the first subframe and the third subframe, and wherein the transmit circuitry is configured to not transmit data over the wired communication link in the discontinuous operation interval of the first subframe.

Example 54 is the apparatus of example 41, wherein the second subframe and the third subframe comprise only the respective discontinuous operation interval.

Example 55 is the apparatus of example 54, wherein the transmit circuitry is configured to transmit acknowledgment symbols at least part of possible symbol positions in the discontinuous operation interval of the first subframe, wherein acknowledgment symbols are transmitted at least part of possible symbol positions in the discontinuous operation interval of the fourth subframe, and wherein the acknowledgment symbols indicate a reception acknowledgement for upstream data received from a recipient of the acknowledgment symbols.

Example 56 is the apparatus of any of examples 41 to 46 or 50 to 55, wherein one or more of a quiet symbol, a symbol that transmits no power as data or no signal is transmitted in the respective discontinuous operation interval of at least one of the first to fourth subframes.

Example 57 is the apparatus of any of examples 41 to 56, further comprising receive circuitry for receiving the downstream data during the frame.

Example 58 is the apparatus of any of examples 41 to 57, wherein the wired communication link comprises a plurality of copper wires.

Example 59 is the apparatus of any of examples 41 to 58, wherein the transmit circuitry is configured to transmit the upstream data in a predefined frequency band that is concurrently used for the downstream data transmission in the frame.

Example 60 is a communication system, comprising: an apparatus according to any of examples 41 to 59; and a communication device coupled to the apparatus via a wired communication link, wherein the communication device comprises circuitry configured to perform one or more of the following: receive the upstream data during the frame; and transmit the downstream data during the frame.

Example 61 is a method for an apparatus coupleable to a wired communication link, the method comprising: transmitting upstream data over the wired communication link during a frame for full duplex data transmission, wherein the frame comprises a first subframe and a second subframe for upstream data transmission, wherein the first subframe coincides in time with a third subframe of the frame for downstream data transmission, wherein the second subframe coincides in time with a fourth subframe of the frame for downstream data transmission, wherein the second subframe and the third subframe are priority subframes, wherein the first subframe and the fourth subframe are non-priority subframes, and wherein each of the second subframe and the third subframe comprises a respective discontinuous operation interval.

Example 62 is the method of example 61, wherein each of the first to fourth subframes further comprises a respective continuous operation interval.

Example 63 is the method of example 61 or example 62, wherein each of the first subframe and the fourth subframe comprises a respective no transmission interval, wherein no upstream data are transmitted in the no transmission interval of the first subframe, and wherein no downstream data are transmitted in the no transmission interval of the fourth subframe.

Example 64 is the method of example 62, wherein each of the first subframe and the fourth subframe comprises a respective discontinuous operation interval, wherein boundaries between the respective continuous operation interval and the respective discontinuous operation interval of the first subframe and the third subframe are aligned in time, and wherein boundaries between the respective continuous operation interval and the respective discontinuous operation interval of the second subframe and the fourth subframe are aligned in time.

Example 65 is the method of example 62, wherein each of the first subframe and the fourth subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

Example 66 is the method of example 65, wherein the continuous operation interval of the third subframe partially overlaps in time with the discontinuous operation interval of the first subframe, wherein the continuous operation interval of the second subframe partially overlaps in time with the discontinuous operation interval of the fourth subframe, and wherein the transmit circuitry is configured to transmit less than five symbols in the continuous operation interval of the first subframe.

Example 67 is the method of example 65, wherein only acknowledgment symbols are transmitted in the discontinuous operation interval of the first subframe, wherein only acknowledgment symbols are transmitted in the discontinuous operation interval of the fourth subframe, and wherein the acknowledgment symbols indicate a reception acknowledgement for data received from a recipient of the acknowledgment symbols.

Example 68 is the method of example 67, wherein the acknowledgment symbols additionally indicate pre-compensation data for the recipient of the acknowledgment symbols for crosstalk compensation.

Example 69 is the method of example 65, wherein only pre-compensation symbols are transmitted in the discontinuous operation interval of the first subframe, wherein only precompensation symbols are transmitted in the discontinuous operation interval of the fourth subframe, and wherein the pre-compensation symbols indicate pre-compensation data for a recipient of the pre-compensation symbols for crosstalk compensation.

Example 70 is the method of example 62, wherein each of the first subframe and the fourth subframe comprises a respective discontinuous operation interval, wherein boundaries between the respective continuous operation interval and the respective discontinuous operation interval of the second subframe and the fourth subframe are aligned in time, wherein the continuous operation interval of one of the first subframe and the third subframe partially overlaps in time with the discontinuous operation interval of the other one of the first subframe and the third subframe, and wherein the transmit circuitry is configured to not transmit upstream data in the discontinuous operation interval of the first subframe.

Example 71 is the method of example 62, further comprising: receiving the downstream data from the wired communication link, wherein the downstream data indicate possible symbol positions in the discontinuous operation interval of the second subframe that are assigned to the apparatus for the upstream data transmission, and wherein data symbols are transmitted in the discontinuous operation interval of the second subframe only at the possible symbol positions assigned to the apparatus.

Example 72 is the method of example 71, wherein data symbols of the downstream data are received only at possible symbol positions that are different from the possible symbol positions assigned to the apparatus in the discontinuous operation interval of the second subframe.

Example 73 is the method of example 62, wherein each of the first subframe and the fourth subframe comprises a respective discontinuous operation interval, wherein the fourth subframe comprises a no transmission interval arranged between the continuous operation interval and the discontinuous operation interval, wherein no downstream data is transmitted in the no transmission interval of the fourth subframe, wherein the discontinuous operation intervals of the second subframe and the fourth subframe coincide in time, and wherein a boundary between the continuous operation interval and the discontinuous operation interval of the second subframe is aligned in time with a boundary between the no transmission interval and the discontinuous operation interval of the fourth subframe, and wherein the continuous operation interval of one of the first subframe and the third subframe partially overlaps in time with the discontinuous operation interval of the other one of the first subframe and the third subframe, and wherein no upstream data are transmitted in the discontinuous operation interval of the first subframe.

Example 74 is the method of example 61, wherein the second subframe and the third subframe comprise only the respective discontinuous operation interval.

Example 75 is the method of example 74, wherein acknowledgment symbols are transmitted at least part of possible symbol positions in the discontinuous operation interval of the first subframe, wherein acknowledgment symbols are transmitted at least part of possible symbol positions in the discontinuous operation interval of the fourth subframe, and wherein the acknowledgment symbols indicate a reception acknowledgement for upstream data received from a recipient of the acknowledgment symbols.

Example 76 is the apparatus of any of examples 61 to 66 or 70 to 75, wherein one or more of a quiet symbol, a symbol that transmits no power as data or no signal is transmitted in the respective discontinuous operation interval of at least one of the first to fourth subframes.

Example 77 is the method of any of examples 61 to 76, further comprising: receiving the downstream data during the frame.

Example 78 is the method of any of examples 61 to 77, wherein the wired communication link comprises a plurality of copper wires.

Example 79 is the method of any of examples 61 to 78, wherein the upstream data are transmitted in a predefined frequency band that is concurrently used for the downstream data transmission in the frame.

Example 80 is a communication method for communication system, wherein the communication system comprises an apparatus coupled to a communication device via a wired communication link, the method comprising: operating the apparatus according to the method of any of examples 61 to 79; and performing one or more of the following at the communication device: receiving the upstream data during the frame; and transmitting the downstream data during the frame.

Example 81 is an apparatus for a wired communication link, the apparatus comprising transmit circuitry for transmitting downstream data over the wired communication link during a frame for full duplex data transmission, wherein the frame comprises a priority subframe and a non-priority subframe for downstream data transmission, wherein the priority subframe for downstream data transmission coincides in time with a non-priority subframe of the frame for upstream data transmission, wherein the non-priority subframe for downstream data transmission coincides in time with a priority subframe of the frame for upstream data transmission, wherein the non-priority subframe for downstream data transmission comprises a continuous operation interval and a no transmission interval, and wherein the transmit circuitry is configured to not transmit over the wired communication link in the no transmission interval of the non-priority subframe for downstream data transmission.

Example 82 is the apparatus of example 81, wherein the non-priority subframe for upstream data transmission comprises a continuous operation interval and a no transmission interval, and wherein no upstream transmission over the wired communication link is performed in the no transmission interval of the non-priority subframe for upstream data transmission.

Example 83 is the apparatus of example 81 or example 82, wherein the priority subframe for downstream data transmission and the priority subframe for upstream data transmission both comprise a respective discontinuous operation interval.

Example 84 is the apparatus of any of example 81 to 83, wherein the priority subframe for downstream data transmission and the priority subframe for upstream data transmission both comprise a respective continuous operation interval.

Example 85 is the apparatus of any of examples 81 to 84, further comprising receive circuitry for receiving the upstream data during the frame.

Example 86 is a method for an apparatus coupleable to a wired communication link, the method comprising: transmitting downstream data over the wired communication link during a frame for full duplex data transmission, wherein the frame comprises a priority subframe and a non-priority subframe for downstream data transmission, wherein the priority subframe for downstream data transmission coincides in time with a non-priority subframe of the frame for upstream data transmission, wherein the non-priority subframe for downstream data transmission coincides in time with a priority subframe of the frame for upstream data transmission, wherein the non-priority subframe for downstream data transmission comprises a continuous operation interval and a no transmission interval, and wherein the apparatus does not transmit over the wired communication link in the no transmission interval of the non-priority subframe for downstream data transmission.

Example 87 is the method of example 86, wherein the non-priority subframe for upstream data transmission comprises a continuous operation interval and a no transmission interval, and wherein no upstream transmission over the wired communication link is performed in the no transmission interval of the non-priority subframe for upstream data transmission.

Example 88 is the method of example 86 or example 87, wherein the priority subframe for downstream data transmission and the priority subframe for upstream data transmission both comprise a respective discontinuous operation interval.

Example 89 is the method of any of example 86 to 88, wherein the priority subframe for downstream data transmission and the priority subframe for upstream data transmission both comprise a respective continuous operation interval.

Example 90 is the method of any of examples 86 to 89, further comprising: receiving the upstream data during the frame.

Example 91 is an apparatus for a wired communication link, the apparatus comprising transmit circuitry for transmitting upstream data over the wired communication link during a frame for full duplex data transmission, wherein the frame comprises a priority subframe and a non-priority subframe for upstream data transmission, wherein the priority subframe for upstream data transmission coincides in time with a non-priority subframe of the frame for downstream data transmission, wherein the non-priority subframe for upstream data transmission coincides in time with a priority subframe of the frame for downstream data transmission, wherein the non-priority subframe for upstream data transmission comprises a continuous operation interval and a no transmission interval, and wherein the transmit circuitry is configured to not transmit over the wired communication link in the no transmission interval of the non-priority subframe for upstream data transmission.

Example 92 is the apparatus of example 91, wherein the non-priority subframe for downstream data transmission comprises a continuous operation interval and a no transmission interval, and wherein no downstream transmission over the wired communication link is performed in the no transmission interval of the non-priority subframe for downstream data transmission.

Example 93 is the apparatus of example 91 or example 92, wherein the priority subframe for upstream data transmission and the priority subframe for downstream data transmission both comprise a respective discontinuous operation interval.

Example 94 is the apparatus of any of example 91 to 93, wherein the priority subframe for upstream data transmission and the priority subframe for downstream data transmission both comprise a respective continuous operation interval.

Example 95 is the apparatus of any of examples 91 to 94, further comprising receive circuitry for receiving the downstream data during the frame.

Example 96 is a method for an apparatus coupleable to a wired communication link, the method comprising: transmitting upstream data over the wired communication link during a frame for full duplex data transmission, wherein the frame comprises a priority subframe and a non-priority subframe for upstream data transmission, wherein the priority subframe for upstream data transmission coincides in time with a non-priority subframe of the frame for downstream data transmission, wherein the non-priority subframe for upstream data transmission coincides in time with a priority subframe of the frame for downstream data transmission, wherein the non-priority subframe for upstream data transmission comprises a continuous operation interval and a no transmission interval, and wherein the apparatus does not transmit over the wired communication link in the no transmission interval of the nonpriority subframe for upstream data transmission.

Example 97 is the method of example 96, wherein the non-priority subframe for downstream data transmission comprises a continuous operation interval and a no transmission interval, and wherein no downstream transmission over the wired communication link is performed in the no transmission interval of the non-priority subframe for downstream data transmission.

Example 98 is the method of example 96 or example 97, wherein the priority subframe for upstream data transmission and the priority subframe for downstream data transmission both comprise a respective discontinuous operation interval.

Example 99 is the method of any of example 96 to 98, wherein the priority subframe for upstream data transmission and the priority subframe for downstream data transmission both comprise a respective continuous operation interval.

Example 100 is the method of any of examples 96 to 99, further comprising: receiving the downstream data during the frame.

Example 101 is an apparatus for a wired communication link, the apparatus comprising transmit circuitry for transmitting downstream data over the wired communication link during a frame for full duplex data transmission, wherein the frame comprises a priority subframe and a non-priority subframe for downstream data transmission, wherein the priority subframe for downstream data transmission coincides in time with a non-priority subframe of the frame for upstream data transmission, wherein the non-priority subframe for downstream data transmission coincides in time with a priority subframe of the frame for upstream data transmission, wherein the non-priority subframe for downstream data transmission comprises a continuous operation interval, wherein the continuous operation interval of the non-priority subframe for downstream data transmission extends only over part of the non-priority subframe for downstream data transmission, and wherein the transmit circuitry is configured to end transmission over the wired communication link in the non-priority subframe for downstream data transmission at the end of the continuous operation interval.

Example 102 is the apparatus of example 101, wherein the non-priority subframe for upstream data transmission comprises a continuous operation interval, wherein the continuous operation interval of the non-priority subframe for upstream data transmission extends only over part of the non-priority subframe for upstream data transmission, and wherein upstream transmission over the wired communication link in the non-priority subframe for upstream data transmission ends at the end of the continuous operation interval of the non-priority subframe for upstream data transmission.

Example 103 is the apparatus of example 101 or example 102, wherein the priority subframe for downstream data transmission and the priority subframe for upstream data transmission both comprise a respective discontinuous operation interval.

Example 104 is the apparatus of any of examples 101 to 103, wherein the priority subframe for downstream data transmission and the priority subframe for upstream data transmission both comprise a respective continuous operation interval.

Example 105 is the apparatus of any of examples 101 to 104, further comprising receive circuitry for receiving the upstream data during the frame.

Example 106 is a method for an apparatus coupleable to a wired communication link, the method comprising: transmitting downstream data over the wired communication link during a frame for full duplex data transmission, wherein the frame comprises a priority subframe and a non-priority subframe for downstream data transmission, wherein the priority subframe for downstream data transmission coincides in time with a non-priority subframe of the frame for upstream data transmission, wherein the non-priority subframe for downstream data transmission coincides in time with a priority subframe of the frame for upstream data transmission, wherein the non-priority subframe for downstream data transmission comprises a continuous operation interval, wherein the continuous operation interval of the non-priority subframe for downstream data transmission extends only over part of the non-priority subframe for downstream data transmission, and wherein downstream transmission over the wired communication link in the non-priority subframe for downstream data transmission ends at the end of the continuous operation interval.

Example 107 is the method of example 106, wherein the non-priority subframe for upstream data transmission comprises a continuous operation interval, wherein the continuous operation interval of the non-priority subframe for upstream data transmission extends only over part of the non-priority subframe for upstream data transmission, and wherein upstream transmission over the wired communication link in the non-priority subframe for upstream data transmission ends at the end of the continuous operation interval of the non-priority subframe for upstream data transmission.

Example 108 is the method of example 106 or example 107, wherein the priority subframe for downstream data transmission and the priority subframe for upstream data transmission both comprise a respective discontinuous operation interval.

Example 109 is the method of any of examples 106 to 108, wherein the priority subframe for downstream data transmission and the priority subframe for upstream data transmission both comprise a respective continuous operation interval.

Example 110 is the method of any of examples 106 to 109, further comprising: receiving the upstream data during the frame.

Example 111 is an apparatus for a wired communication link, the apparatus comprising transmit circuitry for transmitting upstream data over the wired communication link during a frame for full duplex data transmission, wherein the frame comprises a priority subframe and a non-priority subframe for upstream data transmission, wherein the priority subframe for upstream data transmission coincides in time with a non-priority subframe of the frame for downstream data transmission, wherein the non-priority subframe for upstream data transmission coincides in time with a priority subframe of the frame for downstream data transmission, wherein the non-priority subframe for upstream data transmission comprises a continuous operation interval, wherein the continuous operation interval of the non-priority subframe for upstream data transmission extends only over part of the non-priority subframe for upstream data transmission, and wherein the transmit circuitry is configured to end transmission over the wired communication link in the non-priority subframe for upstream data transmission at the end of the continuous operation interval.

Example 112 is the apparatus of example 111, wherein the non-priority subframe for downstream data transmission comprises a continuous operation interval, wherein the continuous operation interval of the non-priority subframe for downstream data transmission extends only over part of the non-priority subframe for downstream data transmission, and wherein downstream transmission over the wired communication link in the non-priority subframe for downstream data transmission ends at the end of the continuous operation interval of the non-priority subframe for downstream data transmission.

Example 113 is the apparatus of example 111 or example 112, wherein the priority subframe for upstream data transmission and the priority subframe for downstream data transmission both comprise a respective discontinuous operation interval.

Example 114 is the apparatus of any of examples 111 to 113, wherein the priority subframe for upstream data transmission and the priority subframe for downstream data transmission both comprise a respective continuous operation interval.

Example 115 is the apparatus of any of examples 111 to 114, further comprising receive circuitry for receiving the downstream data during the frame.

Example 116 is a method for an apparatus coupleable to a wired communication link, the method comprising: transmitting upstream data over the wired communication link during a frame for full duplex data transmission, wherein the frame comprises a priority subframe and a non-priority subframe for upstream data transmission, wherein the priority subframe for upstream data transmission coincides in time with a non-priority subframe of the frame for downstream data transmission, wherein the non-priority subframe for upstream data transmission coincides in time with a priority subframe of the frame for downstream data transmission, wherein the non-priority subframe for upstream data transmission comprises a continuous operation interval, wherein the continuous operation interval of the non-priority subframe for upstream data transmission extends only over part of the non-priority subframe for upstream data transmission, and wherein upstream transmission over the wired communication link in the non-priority subframe for upstream data transmission ends at the end of the continuous operation interval.

Example 117 is the method of example 116, wherein the non-priority subframe for downstream data transmission comprises a continuous operation interval, wherein the continuous operation interval of the non-priority subframe for downstream data transmission extends only over part of the non-priority subframe for downstream data transmission, and wherein downstream transmission over the wired communication link in the non-priority subframe for downstream data transmission ends at the end of the continuous operation interval of the non-priority subframe for downstream data transmission.

Example 118 is the method of example 116 or example 117, wherein the priority subframe for upstream data transmission and the priority subframe for downstream data transmission both comprise a respective discontinuous operation interval.

Example 119 is the method of any of examples 116 to 118, wherein the priority subframe for upstream data transmission and the priority subframe for downstream data transmission both comprise a respective continuous operation interval.

Example 120 is the method of any of examples 116 to 119, further comprising:

receiving the downstream data during the frame.

Examples of the present disclosure may enable discontinuous operation in an FDX mode.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for a wired communication link, the apparatus comprising transmit circuitry for transmitting downstream data over the wired communication link during a frame for full duplex data transmission,
   wherein the frame comprises a first subframe and a second subframe for downstream data transmission, wherein the first subframe coincides in time with transmission of a third subframe of the frame for upstream data transmission, wherein the second subframe coincides in time with transmission of a fourth subframe of the frame for upstream data transmission,
   wherein the first subframe and the fourth subframe are priority subframes, wherein the second subframe and the third subframe are non-priority subframes, and
   wherein each of the first subframe and the fourth subframe comprises a respective discontinuous operation interval.

2. The apparatus of claim 1, wherein each of the first to fourth subframes further comprises a respective continuous operation interval.

3. The apparatus of claim 1, wherein each of the second subframe and the third subframe comprises a respective no transmission interval, wherein the transmit circuitry is configured to not transmit data over the wired communication link in the no transmission interval of the second subframe, and wherein no upstream data are transmitted in the no transmission interval of the third subframe.

4. The apparatus of claim 2, wherein each of the second subframe and the third subframe comprises a respective discontinuous operation interval, wherein boundaries between the respective continuous operation interval and the respective discontinuous operation interval of the first subframe and the third subframe are aligned in time, and wherein boundaries between the respective continuous operation interval and the respective discontinuous operation interval of the second subframe and the fourth subframe are aligned in time.

5. The apparatus of claim 2, wherein each of the second subframe and the third subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

6. The apparatus of claim 5, wherein the continuous operation interval of the first subframe partially overlaps in time with the discontinuous operation interval of the third subframe, wherein the continuous operation interval of the fourth subframe partially overlaps in time with the discontinuous operation interval of the second subframe, and wherein the transmit circuitry is configured to transmit less than five symbols in the continuous operation interval of the second subframe.

7. The apparatus of claim 5, wherein the transmit circuitry is configured to only transmit acknowledgment symbols in the discontinuous operation interval of the second subframe, wherein only acknowledgment symbols are transmitted in the discontinuous operation interval of the third subframe, and wherein the acknowledgment symbols indicate a reception acknowledgement for data received from a recipient of the acknowledgment symbols.

8. The apparatus of claim 7, wherein the acknowledgment symbols additionally indicate pre-compensation data for the recipient of the acknowledgment symbols for crosstalk compensation.

9. The apparatus of claim 5, wherein the transmit circuitry is configured to only transmit pre-compensation symbols in the discontinuous operation interval of the second subframe, wherein only pre-compensation symbols are transmitted in the discontinuous operation interval of the third subframe, and wherein the pre-compensation symbols indicate pre-compensation data for a recipient of the pre-compensation symbols for crosstalk compensation.

10. The apparatus of claim 2, wherein each of the second subframe and the third subframe comprises a respective discontinuous operation interval, wherein boundaries between the respective continuous operation interval and the respective discontinuous operation interval of the second subframe and the fourth subframe are aligned in time, wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

11. The apparatus of claim 2, further comprising control circuitry configured to assign possible symbol positions for upstream data transmission in the frame to another apparatus coupled to the wired communication link, and wherein the downstream data indicate the possible symbol positions assigned to the other apparatus.

12. The apparatus of claim 11, wherein each of the second subframe and the third subframe comprises a respective discontinuous operation interval, wherein the transmit circuitry is configured to transmit data symbols in the discontinuous operation interval of the second subframe only at possible symbol positions of the second subframe different from the possible symbol positions assigned to the other apparatus.

13. The apparatus of claim 2, wherein each of the second subframe and the third subframe comprises a respective discontinuous operation interval, wherein the second subframe comprises a no transmission interval arranged between the continuous operation interval and the discontinuous operation interval, wherein the transmit circuitry is configured to not transmit data in the no transmission interval of the second subframe, wherein the discontinuous operation intervals of the second subframe and the fourth subframe coincide in time, wherein a boundary between the continuous operation interval and the discontinuous operation interval of the fourth subframe is aligned in time with a boundary between the no transmission interval and the discontinuous operation interval of the second subframe, and wherein the continuous operation interval of one of the first subframe and the third subframe partially overlaps in time with the discontinuous operation interval of the other one of the first subframe and the third subframe, and wherein no upstream data are transmitted in the discontinuous operation interval of the third subframe.

14. The apparatus of claim 1, wherein the second subframe and the third subframe comprise only a respective discontinuous operation interval.

15. The apparatus of claim 14, wherein the transmit circuitry is configured to transmit acknowledgment symbols at at least part of possible symbol positions in the discontinuous operation interval of the second subframe, and wherein acknowledgment symbols are transmitted at at least part of possible symbol positions in the discontinuous operation interval of the third subframe, and wherein the acknowledgment symbols indicate a reception acknowledgement for upstream data received from a recipient of the acknowledgment symbols.

16. The apparatus of claim 1, wherein one or more of at least one quiet symbol, at least one symbol that transmits no power as data or no signal is transmitted in the respective discontinuous operation interval of at least one of the first to fourth subframes.

17. The apparatus of claim 1, further comprising receive circuitry for receiving the upstream data during the frame.

18. The apparatus of claim 1, wherein the wired communication link comprises a plurality of copper wires.

19. The apparatus of claim 1, wherein the transmit circuitry is configured to transmit the downstream data in a predefined frequency band that is concurrently used for the upstream data transmission in the frame.

20. A communication system, comprising:
an apparatus according to claim 1; and
a communication device coupled to the apparatus via a wired communication link, wherein the communication device comprises circuitry configured to perform one or more of the following:
receive the downstream data during the frame; and
transmit the upstream data during the frame.

21. A method for an apparatus coupled to a wired communication link, the method comprising:
transmitting downstream data over the wired communication link during a frame for full duplex data transmission,
wherein the frame comprises a first subframe and a second subframe for downstream data transmission, wherein the first subframe coincides in time with transmission of a third subframe of the frame for upstream data transmission, wherein the second subframe coincides in time with transmission of a fourth subframe of the frame for upstream data transmission,
wherein the first subframe and the fourth subframe are priority subframes, wherein the second subframe and the third subframe are non-priority subframes, and
wherein each of the first subframe and the fourth subframe comprises a respective discontinuous operation interval.

22. The method of claim 21, wherein each of the first to fourth subframes further comprises a respective continuous operation interval.

23. The method of claim 21, wherein each of the second subframe and the third subframe comprises a respective no transmission interval, wherein no downstream data are transmitted in the no transmission interval of the second subframe, and wherein no upstream data are transmitted in the no transmission interval of the third subframe.

24. The method of claim 22, wherein each of the second subframe and the third subframe comprises a respective discontinuous operation interval, wherein the continuous operation interval of one of the first subframe and the third subframe partially overlaps in time with the discontinuous operation interval of the other one of the first subframe and the third subframe, and wherein the continuous operation interval of one of the second subframe and the fourth subframe partially overlaps in time with the discontinuous operation interval of the other one of the second subframe and the fourth subframe.

25. The method of claim 24, wherein the continuous operation interval of the first subframe partially overlaps in time with the discontinuous operation interval of the third subframe, wherein the continuous operation interval of the fourth subframe partially overlaps in time with the discontinuous operation interval of the second subframe, and wherein less than five symbols are transmitted in the continuous operation interval of the second subframe.

* * * * *